United States Patent
Ritter et al.

(10) Patent No.: US 11,323,806 B2
(45) Date of Patent: May 3, 2022

(54) APPARATUS AND METHOD FOR MODIFYING A LOUDSPEAKER SIGNAL FOR PREVENTING DIAPHRAGM OVER-DEFLECTION

(71) Applicant: Fraunhofer-Gesellschaft zur Foerderung der angewandten Forschung e.V., Munich (DE)

(72) Inventors: Robin Ritter, Ilmenau (DE); Andreas Maennchen, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/136,986

(22) Filed: Dec. 29, 2020

(65) Prior Publication Data

US 2021/0120336 A1    Apr. 22, 2021

Related U.S. Application Data

(63) Continuation of application No. PCT/EP2019/067591, filed on Jul. 1, 2019.

(51) Int. Cl.
*H04R 3/02* (2006.01)
*H04R 7/00* (2006.01)
(Continued)

(52) U.S. Cl.
CPC ............. *H04R 3/02* (2013.01); *H04R 3/007* (2013.01); *H04R 7/00* (2013.01); *G06N 3/02* (2013.01)

(58) Field of Classification Search
CPC . H04R 3/02; H04R 3/007; H04R 7/00; G06N 3/02
See application file for complete search history.

(56) References Cited

U.S. PATENT DOCUMENTS

| 4,113,983 A | 9/1978 | Steel |
| 4,327,250 A | 4/1982 | von Recklinghausen |

(Continued)

FOREIGN PATENT DOCUMENTS

| DE | 102018213834.6 B3 | 1/2020 |
| EP | 2827330 A1 | 1/2015 |

(Continued)

OTHER PUBLICATIONS

"Methode de caicul du niveau d'isosonie et de la sonie" [Uploaded in 3 parts], Berechnung des Lautstärkepegels und der Lautheit aus dem Geräuschspektrum, DIN 45631, pp. 1-2, Mar. 1991, pp. 1-7.

(Continued)

*Primary Examiner* — Mark Fischer
(74) *Attorney, Agent, or Firm* — Perkins Coie LLP; Michael A. Glenn

(57) ABSTRACT

Apparatus configured to predict a diaphragm deflection signal, block-by-block, in overlapping time blocks based on the loudspeaker signal to obtain one diaphragm deflection signal block per time block. The apparatus is configured to determine a temporal position of a maximum deflection of a current diaphragm deflection signal block of a current time block within an overlap area with a subsequent time block and to calculate a level up to which the current diaphragm deflection signal block can be controlled without diaphragm over-deflection for the current time block by considering a comparison of the current diaphragm deflection signal block with a subsequent diaphragm deflection signal block or an estimation of the subsequent diaphragm deflection signal block from the current diaphragm deflection signal block at the temporal position. The apparatus is configured to attenuate the current diaphragm deflection signal block and to synthesize a modified loudspeaker signal.

26 Claims, 8 Drawing Sheets

(51) Int. Cl.
*H04R 3/00* (2006.01)
*G06N 3/02* (2006.01)

(56) References Cited

U.S. PATENT DOCUMENTS

| | | | |
|---|---|---|---|
| 5,481,617 | A | 1/1996 | Bjerre |
| 5,528,695 | A | 6/1996 | Klippel |
| 5,577,126 | A | 11/1996 | Klippel |
| 7,372,966 | B2 | 5/2008 | Bright |
| 8,855,322 | B2 | 10/2014 | Ryu et al. |
| 9,807,502 | B1 | 10/2017 | Hatab et al. |
| 2012/0179456 | A1 | 7/2012 | Ryu et al. |
| 2013/0077795 | A1 | 3/2013 | Risbo et al. |
| 2013/0144615 | A1 | 6/2013 | Rauhala et al. |
| 2018/0014121 | A1 | 1/2018 | Lawrence et al. |
| 2018/0184201 | A1* | 6/2018 | Lawrence ............ H04R 29/003 |

FOREIGN PATENT DOCUMENTS

| | | |
|---|---|---|
| EP | 3089364 A1 | 11/2016 |
| EP | 3110169 A1 | 12/2016 |
| GB | 2539725 A | 12/2016 |
| WO | 0103466 A2 | 1/2001 |
| WO | 2018101868 A1 | 6/2018 |
| WO | 2020007793 A1 | 1/2020 |

OTHER PUBLICATIONS

"Akustik—Bestimmung der Schallleistungspegel von Geräuschquellen aus Schalldruckmessungen, [Uploaded in 5 parts],—Verfahren der Genauigkeitsklasse 1 für reflexionsarme Räume und Halbräume", Deutsche Fassung EN ISO 3745:2003, pp. 10, 28, 2003, pp. 1-7.
"Elektroakustik—Schallpegelmesser", [Uploaded in 6 parts], Teil 1: Anforderungen (IEC 61672-1:2103); Deutsche Fassung EN 61672-1:2013, pp. 20-21, 49, Jul. 2014, forward, pp. 1-8.
Behler, Gottfried, et al., "Loudspeaker protection system for mobile devices", Proceedings of the 22nd International Congress on Acoustics. Buenos Aires, Argentina, 10 pp.
Beranek, Leo L, et al., "Acoustics—Sound Fields and Transducers", 1. Ed. New York, USA, Elsevier Inc., 2012. (ISBN 9780123914217), pp. 247-249updated version of Leo L. Beranek's edition of 1954, 2012, pp. 247-249.
Borwick, J., Loudspeaker and Headphone Handbook, 3rd editionhttps://www.magentacloud.de/share/9uabrija79, 2001.
Cooley, James W, et al., "An algorithm for the machine calculation of complex Fourier series", Mathematics of Computation 19, 1965, pp. 297-301.
Enders, Roland, "Das Homerecording Handbuch", 3rd Ed. Munich, Germany: GC Carstensen, 1997, p. 128-129 and 254-255, pp. 128-129, 254-255.
Girardin, Guillaume, "Acoustic MEMS and Audio Solutions", Yole Development. Villeurbanne, France, 5 pp.
Hofmann, S, "Numerische Integration von Beschleunigungssignalen", Institut für Maschinenwesen—Institutsmitteilung 38 (2013), pp. 103-114, pp. 103-114.
Klippel, Wolfang, et al., "[Uploaded in 2 parts] Fast and Accurate Measurement of Linear Transducer Parameters", Proceedings of the 110th Audio Engineering Society Convention. Amsterdam, Netherlands, Mai 2001, pp. 1-4.
Klippel, Wolfgang, "[Uploaded in 4 parts] Prediction of Speaker Performance at High Amplitudes", Proceedings of the 111th Audio Engineering Society Convention. New York, USA, pp. 1-4.
Klippel, Wolfgang, "[Uploaded in 6 parts] Diagnosis and Remedy of Nonlinearities in Electrodynamical Transducers", Proceedings of the 109th Audio Engineering Society Convention, Los Angeles, USA, pp. 1-6.
Klippel, Wolfgang, "[Uploaded in 7 parts] Tutorial: Loudspeaker Nonlinearities—Causes, Parameters, Symptoms", Journal of the Audio Engineering Society 54, 2006, pp. 907-939, pp. 1-11.
Klippel, Wolfgang, "Mechanical Overload Protection of Loudspeaker Systems", Journal of the Audio Engineering Society 64, pp. 771-783.
Kratsas, Rob, "Unleashing the Audio Potential of Smartphones", Cirrus Logic, 7 pp.
Luo, Chenchi (Eric), et al., "A Model based Excursion Protection Algorithm for Loudspeakers", IEEE International Conference on Acoustics, Speech and Signal Processing (ICASSP). Kyoto, Japan, 4 pp.
Möser, M, "Technische Akus", 8th Ed. Berlin, Germany: Springer, 2009, ISBN 978-3-540-89817-7, pp. 156-158 and 366-367, pp. 156-158, 366-367.
Müller, Swen, "[Uploaded in 4 parts] Digitale Signalverarbeitung für Lautsprecher", Technische Hochschule Aachen, Diss., pp. 1-70.
Powersoft, "How to setup limiters", Technical Note #09 rev. 01, Powersoft, 2012-2013, 2012, 10 pp.
Robjohns, Hugh, ""Hold" parameter in a compressor", SOS Forum, https://www.soundonsound.com/forum/viewtopic.phpf=16&t=55170, 6 pp.
Smith III, Julius O, "Spectral Audio Signal Processing", here: Overlap-Add (OLA) STFT Processing, https://ccrma.stanford.edu/~jos/sasp/, here: Overlap_Add_STFT_Processing.html and Convolution of Short Signals, 2020, 2020, 17 pp.
Smith, Ph.D., Steven W, "The Scientist and Engineer's Guide to Digital Signal Processing", 1st Ed. Oxford, England: Newnes, 2011, ISBN 9780750674447, link to book: http://www.dspguide.com/pdfbook.html, 2011, entire book.
Zollner, M, et al., "Elektroakus", 3rd Ed. Berlin, Germany, Springer, 2003, ISBN 978-3-540-56600-7, p. 153, p. 153.
Zölzer, U, et al., "Digital Audio Signal Processing", 2nd Ed. New York, USA: John Wiley and Sons Ltd, 2008, ISBN 978-0470997857, pp. 241-243, pp. 241-243.

* cited by examiner

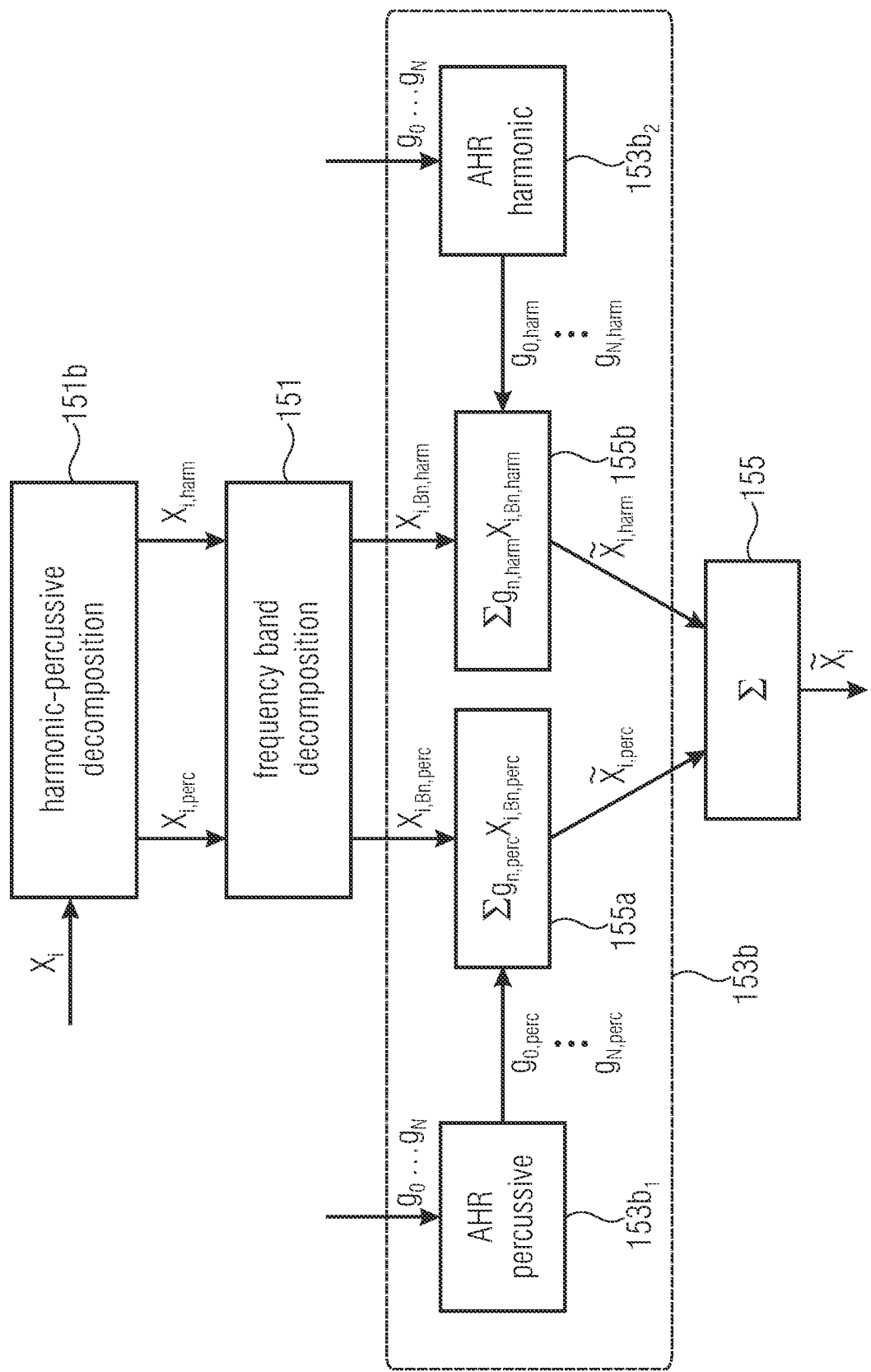

APPARATUS AND METHOD FOR MODIFYING A LOUDSPEAKER SIGNAL FOR PREVENTING DIAPHRAGM OVER-DEFLECTION

CROSS-REFERENCE TO RELATED APPLICATIONS

This application is a continuation of copending International Application No. PCT/EP2019/067591, filed Jul. 1, 2019, which is incorporated herein by reference in its entirety, and additionally claims priority from German Applications Nos. 102018210872.2, filed Jul. 2, 2018, and 102018213834.6, filed Aug. 16, 2018, which are all incorporated herein by reference in their entirety.

Embodiments according to the invention relate to an apparatus and a method for modifying a loudspeaker signal for preventing diaphragm over-deflection. In other words, this can be a deflection limiter, for example.

BACKGROUND OF THE INVENTION

Basic problem: loudspeakers (independent of the actuator principle) may be damaged or destroyed due to excessive mechanical load. Generally, this takes place when applying a high input voltage resulting in excessive deflection of the mechanical components of the sound transducer (diaphragm, suspension, . . . ).

General approach: the diaphragm deflection is limited by controlled reduction of the input voltage at the loudspeaker.

Problems of a simple solution: simple limiters result in poor sound quality and cannot guarantee the mechanical protection of the transducer, or need too much headroom, which does not fully utilize the performance of the transducer.

U.S. Pat. Nos. 4,113,983A, 4,327,250A and 5,481,617A: in these inventions, high-pass filters having a variable cutoff frequency filtering out the low-frequency portions from the input signal based on a deflection model are described. The input signal passes through a high-pass filter whose cutoff frequency is initially very low (e.g., 20 Hz). Subsequently, the signal is split and reaches, on the one hand, the amplifier and further the loudspeaker. On the other hand, the same reaches a model for predicting the diaphragm deflection via a feedback loop. Then, a controller checks whether the amplitude of the predicted signal is above the determined limiting value. If this is the case, the cutoff frequency of the high-pass filter is corrected upwards. A disadvantage of the filter design is that frequency portions that are insignificant for diaphragm deflection may be extracted from the signal. This effects an unnecessary deterioration of the sound quality. A further difficulty is the reaction time of the individual blocks. Since no delay element exists, a certain safety zone to the actual maximum deflection limit has to be kept since the signal needs at least one feedback pass before the protection mechanism becomes active. Thus, impulse-like signal portions are difficult to correct. This additional safety zone reduces the maximum sound pressure level of the system.

US2018001412A1: the input signal is split and reaches, on the one hand, a delay element, whereupon a filterbank decomposes the same into individual frequency bands. Individual attenuation factors are added to these frequency bands. On the other hand, the incoming signal is converted into a deflection signal per model, which is subsequently decomposed into individual frequency bands with individual attenuation factors like in the first signal path. The attenuation factors of both paths are identical. An over-excursion detector checks whether the deflection signal exceeds the determined limiting value. If this is the case, the gain calculator is activated, which calculates new attenuation factors for reducing the deflection. The gain update block responsible for updating the attenuation factors in the voltage signal path operates by considering attack, hold and release times. For calculating the attenuation factors, a normalized least mean squares (NLMS) optimization is used.

A MODEL BASED EXCURSION PROTECTION ALGORITHM FOR LOUDSPEAKERS, Chenchi (Eric) Luo, James McClellan, Milind Borkar, Arthur Redfern: at the beginning, the deflection is predicted for the n+1-th sample, based on the n-th voltage sample as well as a non-linear loudspeaker model. If the diaphragm deflection is too high, this deflection sample is corrected by the compressor and is subsequently calculated back to a voltage sample with the help of an inverse loudspeaker module. With this method, excessive diaphragm deflections are to be localized more easily and hence corrected more specifically. The compressor offers the option for different compression ratios as well as the option for soft knee/hard knee to improve the control of the intensity of the effect.

U.S. Pat. No. 8,855,322B2 shows a multiband limiter (frequency bands oriented at frequency groups of hearing) with a psychoacoustic model for loudness maximization and linear deflection model (transmission function).

U.S. Pat. No. 9,807,502BA shows a loudspeaker controller including deflection limiter, temperature limiter and power reduction with psychoacoustic model.

SUMMARY

According to an embodiment, an apparatus for modifying a loudspeaker signal for preventing diaphragm over-deflection may be configured to predict a diaphragm deflection signal, block-by-block, in overlapping time blocks based on the loudspeaker signal to obtain one diaphragm deflection signal block per time block; determine a temporal position of a maximum deflection of a current diaphragm deflection signal block of a current time block within an overlap area with a subsequent time block; calculate a level up to which the current diaphragm deflection signal block can be controlled without diaphragm over-deflection for the current time block, by considering a comparison of the current diaphragm deflection signal block with a subsequent diaphragm deflection signal block or an estimation of the subsequent diaphragm deflection signal block from the current diaphragm deflection signal block at the temporal position; attenuate the current diaphragm deflection signal block based on the level to obtain a modified current diaphragm deflection signal block; and synthesize a modified loudspeaker signal based on the modified current diaphragm deflection signal block.

According to another embodiment, an apparatus for modifying a loudspeaker signal for preventing diaphragm over-deflection may be configured to predict a diaphragm deflection signal, block-by-block, in overlapping time blocks based on the loudspeaker signal to obtain one diaphragm deflection signal block per time block; determine a first maximum deflection portion for a current diaphragm deflection signal block of a current time block in a first overlap area of the current time block with a preceding time block as well as in the residual area of the current diaphragm deflection signal block; determine a second maximum deflection portion for the current diaphragm deflection signal block of the current time block in a second overlap area of the current time block with a subsequent time block; calculate a level based on the first maximum deflection portion when the first maximum deflection portion is smaller than the second maximum deflection portion or calculate the level based on the second maximum deflection portion when the second maximum deflection portion is smaller than the first maximum deflection portion; attenuate the current diaphragm deflection signal block based on the level to obtain a modified current diaphragm deflection signal block; and synthesize a modified loudspeaker signal based on the modified current diaphragm deflection signal block.

According to another embodiment, a method for modifying a loudspeaker signal for preventing diaphragm over-deflection may have the steps of: block-by-block prediction of a diaphragm deflection signal in overlapping time blocks based on the loudspeaker signal to obtain one diaphragm deflection signal block per time block; determination of a temporal position of a maximum deflection of a current diaphragm deflection signal block of a current time block within an overlap area with a subsequent time block; calculation of a level up to which the current diaphragm deflection signal block can be controlled without diaphragm over-deflection for the current time block by considering a comparison of the current diaphragm deflection signal block with a subsequent diaphragm deflection signal block or an estimation of the subsequent diaphragm deflection signal block from the current diaphragm deflection signal block at the temporal position; attenuation of the current diaphragm deflection signal block based on the level to obtain a modified current diaphragm deflection signal block; and synthesization of a modified loudspeaker signal based on the modified current diaphragm deflection signal block.

According to another embodiment, a method for modifying a loudspeaker signal for preventing diaphragm over-deflection, may have the steps of: block-by-block prediction of a diaphragm deflection signal in overlapping time blocks based on the loudspeaker signal to obtain one diaphragm deflection signal block per time block; determination of a first maximum deflection portion for a current diaphragm deflection signal block of a current time block in a first overlap area of the current time block with a preceding time block as well as in the residual area of the current diaphragm deflection signal block; determination of a second maximum deflection portion for the current diaphragm deflection signal block of the current time block in a second overlap area of the current time block with a subsequent time block; calculation of a level based on the first maximum deflection portion when the first maximum deflection portion is smaller than the second maximum deflection portion or calculation of the level based on the second maximum deflection portion when the second maximum deflection portion is smaller than the first maximum deflection portion; attenuation of the current diaphragm deflection signal block based on the level to obtain a modified current diaphragm deflection signal block; and synthesization of a modified loudspeaker signal based on the modified current diaphragm deflection signal block.

An embodiment relates to an apparatus for modifying a loudspeaker signal for preventing diaphragm over-deflection. The apparatus can be configured to predict a diaphragm deflection signal, block-by-block, in overlapping time blocks based on the loudspeaker signal to obtain one diaphragm deflection signal block per time block. Thus, e.g., before the loudspeaker signal is transmitted to a loudspeaker, the apparatus can infer diaphragm deflection caused, e.g., by the loudspeaker signal at a diaphragm of the loudspeaker, from the loudspeaker signal. Additionally, the apparatus can be configured to determine a temporal position of a maximum deflection of a current diaphragm deflection signal block of a current time block within an overlap area with a subsequent time block. Further, the apparatus can be configured to calculate a level up to which the current diaphragm deflection signal block can be controlled without diaphragm over-deflection for the current time block, by considering a comparison of the current diaphragm deflection signal block with a subsequent diaphragm deflection signal block or an estimation of the subsequent diaphragm deflection signal block from the current diaphragm deflection signal block at the temporal position. A time block following the current time block, which can overlap with the current time block, comprises, e.g., the subsequent diaphragm deflection signal block that can be predicted by the apparatus, for example, explicitly from a subsequent loudspeaker signal of the subsequent time block or can be estimated from the diaphragm deflection signal block of the current time block. Here, the level calculated by the apparatus can represent, for example, a diaphragm deflection amplitude level, a voltage level, a current level, a sound pressure (e.g., in Pascal or in bar), sound energy (in watt), sound power (in watt), a sound intensity (e.g., in watt/m$^2$), a sound power level (e.g., in dB), a sound intensity level (e.g., in decibel), a sound pressure level (e.g., in decibel), a volume level (e.g., in phone or in decibel (A)) or a loudness (e.g., in sone). Further, the apparatus can be configured to attenuate the current diaphragm deflection signal block based on the level to obtain a modified current diaphragm deflection signal block. Additionally, the apparatus can be configured to synthesize a modified loudspeaker signal based on the modified current diaphragm deflection signal block.

This embodiment of the apparatus is based on the finding that by considering both the current time block as well as the subsequent time block, the diaphragm deflection signal of the current time block is not attenuated too little or too much compared to the subsequent diaphragm deflection signal block, whereby high sound quality can be obtained. Here, by the comparison-based attenuation of overlapping diaphragm deflection signal blocks, the apparatus can consider an overlap-add (e.g., a segmented convolution of modified diaphragm deflection signal blocks of successive time blocks), by which a common diaphragm deflection signal can result in the overlap area of the current diaphragm deflection signal block with the subsequent diaphragm deflection signal block, which should comprise a deflection amplitude that is lower than the diaphragm over-deflection so that mechanical protection can be ensured. For this, the apparatus can determine the level up to which the diaphragm deflection signal block can be controlled to attenuate the current diaphragm deflection signal block compared to the subsequent diaphragm deflection signal block in an optimized ratio. The level is determined, for example, at the temporal position of the maximum deflection, since at this temporal position, e.g., diaphragm over-deflection can occur and hence the level can be determined such that the current diaphragm deflection signal block is attenuated such that a maximum diaphragm deflection amplitude can be obtained at this temporal position, e.g., after the overlap-add. Thus, the modified current diaphragm deflection signal block can be obtained, which can ensure that the loudspeaker signal synthesized therefrom, e.g., the diaphragm of the loudspeaker to which the synthesized loudspeaker signal can be transmitted, cannot be damaged by diaphragm over-deflection and the loudspeaker can be operated at high performance, e.g., by using the complete possible deflection of the diaphragm (e.g., up to the maximum diaphragm deflection amplitude) without diaphragm over-deflection.

Therefore, it has to be stated that the apparatus can provide high sound quality with good mechanical protection and high performance due to the synthesized loudspeaker signal.

According to an embodiment, for calculating the level, the apparatus can be configured to determine a quotient between the current diaphragm deflection signal block at the temporal position on the one hand and a sum of the subsequent diaphragm deflection signal block or the estimation of the subsequent diaphragm deflection signal block at the temporal position and the current diaphragm deflection signal block at the temporal position on the other hand. Thus, with the quotient, the current diaphragm deflection signal block can be compared to the subsequent diaphragm deflection signal block. The quotient can define how large a portion of the maximum amplitude of the current diaphragm deflection signal at the temporal position can be of an overall deflection of the current and the subsequent diaphragm deflection signal block together at the temporal position. Thus, based on this quotient, the level can define a maximum diaphragm deflection amplitude at the temporal position for the current time block and, based on the level, the complete current diaphragm deflection signal block can be attenuated such that the attenuated maximum amplitude at the temporal position does not exceed, e.g., the maximum diaphragm deflection amplitude. The quotient allows that the current diaphragm deflection signal block can be attenuated relative to the subsequent diaphragm deflection signal block by the apparatus whereby high sound quality can be obtained.

According to an embodiment, the apparatus is configured to scale the quotient with a safety factor. The safety factor can represent a real number in the range from zero to one. This can obtain a stronger attenuation of the current diaphragm deflection signal block than needed, whereby the mechanical protection of a loudspeaker to which a loudspeaker signal attenuated by the apparatus can be transmitted is optimized and hence long-term stable mechanical protection can be obtained.

One embodiment relates to an apparatus for modifying a loudspeaker signal for preventing diaphragm over-deflection. The apparatus can be configured to predict a diaphragm deflection signal, block-by-block, in overlapping time blocks based on the loudspeaker signal to obtain one diaphragm deflection signal block per time block. In that way, e.g., before the loudspeaker signal is transmitted to a loudspeaker, the apparatus can infer diaphragm deflection caused, e.g., by the loudspeaker signal at the diaphragm of a loudspeaker, from the loudspeaker signal. Additionally, the apparatus can be configured to determine a first maximum deflection portion for a current diaphragm deflection signal block of a current time block in a first overlap area of the current time block with a preceding time block as well as in the residual area of the current diaphragm deflection signal block. In that way, based on the first maximum deflection portion, it can be determined for the complete current time block, e.g., based on a preceding diaphragm deflection signal block modified by the apparatus (e.g., a time block preceding the current time block that can overlap the current time block), how much the current diaphragm deflection signal block is to be attenuated to cause no diaphragm over-deflection, e.g., for an overlap-add of the current diaphragm deflection signal block with the modified preceding diaphragm deflection signal block. Additionally, the apparatus can be configured to determine a second maximum deflection portion for the current diaphragm deflection signal block of the current time block in a second overlap area of the current time block with a subsequent time block. Thus, it can be determined, based on the second maximum deflection portion, e.g., based on a subsequent diaphragm deflection signal block predicted by the apparatus, or based on a subsequent diaphragm deflection signal block estimated by the apparatus, based on the current diaphragm deflection signal block, how much the current diaphragm deflection signal block is to be attenuated, e.g., to cause no diaphragm over-deflection, e.g., for an overlap-add of the current diaphragm deflection signal block with the preceding diaphragm deflection signal block. Here, the subsequent diaphragm deflection signal block can comprise, e.g., a time block following the current time block that can overlap with the current time block. The apparatus can be configured to calculate a level based on the first maximum deflection portion when the first maximum deflection portion is smaller than the second maximum deflection portion or to calculate the level based on the second maximum deflection portion when the second maximum deflection portion is smaller than the first maximum deflection portion. Additionally, the apparatus can be configured to attenuate the current diaphragm deflection signal block based on the level to obtain a modified current diaphragm deflection signal block. Additionally, the apparatus can be configured to synthesize a modified loudspeaker signal based on the modified current diaphragm deflection signal block.

This embodiment of the apparatus is based on the knowledge that based on the first maximum deflection portion or based on the second maximum deflection portion, the apparatus can attenuate the current diaphragm deflection signal block such that, for example, for an overlap-add of a preceding modified loudspeaker signal with the current modified loudspeaker signal, and for an overlap-add of the current modified loudspeaker signal with a subsequent modified loudspeaker signal, diaphragm over-deflection can be prevented. Here, the level that is calculated based on the first maximum deflection portion can define how much the current diaphragm deflection signal block is to be attenuated to cause no diaphragm over-deflection for an overlap-add with a preceding modified diaphragm deflection signal block. Since the diaphragm deflection signal comprises both the preceding diaphragm deflection signal block as well as the current diaphragm deflection signal block in the overlap area of the current time block with the preceding time block, the preceding diaphragm deflection signal block and the current diaphragm deflection signal block can be attenuated relative to one another such that the diaphragm deflection signal does not result in diaphragm over-deflection. If, for example, the preceding diaphragm deflection signal block is already attenuated very much, the current diaphragm deflection signal block can be attenuated only slightly, and if the preceding diaphragm deflection signal block is attenuated only slightly, the apparatus can cause the current diaphragm deflection signal block to be attenuated very much. The second maximum deflection portion can define a ratio between the current diaphragm deflection signal block and the subsequent diaphragm deflection signal block and can hence ensure that the current diaphragm deflection signal block is not attenuated excessively with respect to the subsequent diaphragm deflection signal block and, hence, the apparatus can obtain high sound quality. If, for example, the second maximum deflection portion defines a higher attenuation than the first maximum deflection portion, then the complete current diaphragm deflection signal block will be attenuated according to the level calculated based on the second maximum deflection portion. Here, it is a finding that the current diaphragm deflection signal block is to be attenuated at least so much that diaphragm over-deflection is prevented, such that a deflection amplitude of the complete current diaphragm deflection signal block does not exceed a maximum deflection amplitude (an amplitude greater than the maximum deflection amplitude can result, e.g., in diaphragm over-deflection), therefore, the level is calculated based on the smaller maximum deflection portion as the same can cause greater attenuation. Thus, it is, e.g., advantageous to attenuate the complete current diaphragm deflection signal block with a greater attenuation than with a lower attenuation that causes no diaphragm over-deflection, e.g., only in one of the two overlap areas (e.g., the overlap area of the current time block with the preceding time block or the subsequent time block), but can, e.g., be too low in the other overlap area.

Thus, it has to be stated that the apparatus can provide high sound quality at good mechanical protection and high performance due to the synthesized loudspeaker signal.

According to an embodiment, the apparatus can be configured to calculate the level based on the first maximum deflection portion by means of a product of a maximum deflection limiting value and the first maximum deflection portion or to calculate the level based on the second maximum deflection portion by means of a product of the maximum deflection limiting value and the second maximum deflection portion. The maximum deflection limiting value can define that diaphragm over-deflection results at a deflection amplitude, caused by the modified loudspeaker signal, e.g., after an overlap-add, greater than the maximum deflection limiting value. Since, for example, a modified loudspeaker signal provided by the apparatus can result from an overlap-add of a modified loudspeaker signal of overlapping time blocks, the first maximum deflection portion can define how much the current diaphragm deflection signal block should at least be attenuated to not exceed the maximum deflection limiting value for an overlap-add with the modified preceding diaphragm deflection signal block; and the second maximum deflection portion can define how much the current diaphragm deflection signal block should at least be attenuated to obtain a very good sound quality, to be attenuated in an overlap-add in a good ratio to the subsequent diaphragm deflection signal block. Since hence the level based on the first maximum deflection portion and the level based on the second maximum deflection portion can each define a minimum attenuation of the current diaphragm-deflection signal block, the apparatus can modify the diaphragm deflection signal block according to the level that causes a greater attenuation of the current diaphragm deflection signal block. The level should not be exceeded by the current diaphragm deflection signal block so that no diaphragm over-deflection occurs, e.g., at a loudspeaker.

According to an embodiment, the apparatus can be configured to determine a temporal position of a maximum deflection of the current diaphragm deflection signal block of the current time block within the second overlap area with the subsequent time block. In that way, the temporal position can provide a "critical deflection value" (e.g., the maximum deflection) that can cause diaphragm over-deflection. Further, the apparatus can be configured to determine, for the second maximum deflection portion, a quotient between the current diaphragm deflection signal block at the temporal position on the one hand and a sum of a subsequent diaphragm deflection signal block or an estimation of the subsequent diaphragm deflection signal block at the temporal position, based on the current diaphragm deflection signal block of the current time block, and the current diaphragm deflection signal block at the temporal position on the other hand, whereby the apparatus can modify the current diaphragm deflection signal block in a look-ahead manner to optimize a sound quality.

According to an embodiment, the apparatus can be configured to scale the quotient with a safety factor. The safety factor can be a real number in a range of zero to one. This can obtain a stronger attenuation of the current diaphragm deflection signal block than needed, whereby the mechanical protection of a loudspeaker to which a loudspeaker signal attenuated by the apparatus can be transmitted is optimized and hence long-term stable mechanical protection can be obtained.

According to an embodiment, the apparatus can be configured to estimate the second maximum deflection portion based on the current diaphragm deflection signal block. Thereby, the apparatus uses only, e.g., the current diaphragm deflection signal block for determining the second maximum deflection portion, whereby the apparatus can attenuate the current diaphragm deflection signal block more efficiently and more easily, and can hence offer a very effective mechanical protection, e.g., for loudspeakers.

According to an embodiment, the apparatus can be configured to estimate the second maximum deflection portion based on the current diaphragm deflection signal block by means of a neural network. The neural network allows a very exact estimation of the second maximum deflection portion, whereby the apparatus can attenuate the current diaphragm deflection signal block with very high efficiency and very high velocity to prevent diaphragm over-deflection.

According to an embodiment, the apparatus can be configured to decompose the current diaphragm deflection signal block into at least one frequency band signal time block. Here, the at least one frequency band signal time block can comprise, e.g., a frequency band of the current diaphragm deflection signal block across the complete current time block. Since individual frequency bands are to experience, for example, a different attenuation so that no diaphragm over-deflection results and the sound quality can be improved, decomposition of the current diaphragm deflection signal block into the at least one frequency band signal time block is advantageous.

According to an embodiment, the apparatus can be configured to determine, for each of the at least one frequency band signal time block, at least one further temporal position where a predetermined signal combination exceeds a maximum deflection limiting value in the first overlap area of the current time block with the preceding time block as well as in the residual time block. Thus, the further positions (e.g., each frequency band signal time block can have a further position) can indicate, e.g., that the respective frequency time block or the current diaphragm deflection signal block should be attenuated by the apparatus at these positions so that no diaphragm over-deflection is caused. By using the signal combination, it can additionally be ensured that the further position determined in that manner does not actually represent a "critical position" that should be attenuated, whereby the apparatus can find out positions (e.g., the further temporal positions) that can cause diaphragm over-deflection very efficiently and with very few or no errors.

According to an embodiment, the signal combination can include an additive combination of the current diaphragm deflection signal block with a modified preceding diaphragm deflection signal block; and an additive combination of the respective frequency band signal time block with the modified preceding diaphragm deflection signal block; and an additive combination of an amount of the current diaphragm deflection signal block with an amount of the modified preceding diaphragm deflection signal block. These three additive combinations allow, among others, that the further temporal positions where, e.g., a maximum deflection can occur, are determined such that the same comprise, e.g., no temporal position where the maximum deflections of individual frequency band signal time blocks cancel each other out, e.g., due to a phase position. Additionally, the three additive combinations can consider that maximum amplitudes in frequency band signal time blocks with a relatively high-frequent band are to be attenuated to a sufficient extent; and maximum deflections that are close in time in different frequency band signal time blocks can result in smears of a maximum deflection at the temporal position. Thus, the apparatus can provide very efficiently and securely a good mechanical protection, for example of a loudspeaker to which the apparatus can transmit the modified loudspeaker signal.

According to an embodiment, the apparatus can be configured to determine an attenuation factor for each of the at least one frequency band signal time block based on the level and the further temporal position to attenuate the current diaphragm deflection signal block. Thus, a frequency band-dependent attenuation is ensured, whereby the sound quality can be optimized.

According to an embodiment, the apparatus can be configured to compare the attenuation factor per frequency band signal time block for the current time block with a version of the attenuation factor per frequency band signal time block for the preceding time block, reduced in attenuation strength by a predetermined fading-away function and to use a selected attenuation factor that is associated with a higher attenuation for the current time block of the same. This can take place, for example, by means of attack, hold and release functions and can result in an optimization of the sound quality. The predetermined fading-away function can define, e.g., how fast an attenuation applied by the apparatus to the current diaphragm deflection signal block can fade away and can, hence, provide, e.g., the original loudspeaker signal without attenuation. The release function can comprise different release times to improve the sound quality. The release times can depend, among others, on a duration of crossings of a maximum deflection limit as well as on a strength of the attenuation. Thus, it is enabled that the current diaphragm deflection signal block is attenuated sufficiently long, but not too long to prevent that the current diaphragm deflection signal block is also attenuated at positions that do not result in diaphragm over-deflection.

According to an embodiment, the apparatus can be configured to split the current diaphragm deflection signal block into a percussive signal portion and a harmonic signal portion to determine the predetermined fading-away function in dependence on the percussive signal portion and/or the harmonic signal portion. The predetermined fading-away function can comprise time constants that may differ for the percussive signal portion and/or the harmonic signal portion to optimize the sound quality. Thus, for example, short-time constants can be advantageous for the percussive signal portion and long-time constants for the harmonic signal portion.

According to an embodiment, the apparatus can be configured to calculate, for each of the at least one further temporal position, a first maximum deflection portion for the current time block by considering the maximum deflection limiting value and the modified preceding diaphragm deflection signal block. Thus, the first maximum deflection portion can define which portion of the maximum deflection limiting value the current diaphragm deflection signal block takes up, for example by considering a portion of the modified preceding diaphragm deflection signal block of the maximum deflection limiting value in the calculation. Here, for example, an overlap-add between the preceding time block and the current time block, which can have an influence on the diaphragm over-deflection, is considered.

According to an embodiment, the apparatus can be configured to calculate the first maximum deflection portion from a quotient between a difference of the maximum deflection limiting value, wherein a sign of the maximum deflection limiting value depends on the current diaphragm deflection signal block at the further temporal position and the modified preceding diaphragm deflection signal block on the one hand and the maximum deflection limiting value on the other hand. Thus, the first maximum deflection portion can indicate in percent how much the current diaphragm deflection signal block should be attenuated by the apparatus in relation to the maximum deflection limiting value. The first maximum deflection portion, summed-up with a portion of the modified preceding diaphragm deflection signal block at the maximum deflection limiting value amounts to, e.g., 100%. Optionally, the apparatus can be configured to multiply the first maximum deflection portion with the maximum deflection limiting value to determine the level that the current diaphragm deflection signal block should, e.g., not exceed to prevent diaphragm over-deflection.

According to an embodiment, the apparatus can be configured to calculate a modified current loudspeaker signal block from the modified current diaphragm deflection signal block and to subject a first part (e.g., an overlap area of the current time block with the preceding time block) of the modified current loudspeaker signal block to an overlap-add with a modified preceding loudspeaker signal block to synthesize a modified loudspeaker signal. In other words, an output to the loudspeaker is, e.g., only the overlap of the preceding modified loudspeaker signal block with the first part of the current modified loudspeaker signal block. For the overlap-add, the apparatus can be configured, e.g., to compute the modified loudspeaker signal of the current time block with a modified loudspeaker signal of the preceding time block to an overall loudspeaker signal in the first overlap area and to compute the modified loudspeaker signal of the current time block with a modified loudspeaker signal of the subsequent time block to an overall loudspeaker signal in the second overlap area. Thus, the overall loudspeaker signal can include, e.g., all modified loudspeaker signals of all time blocks and can compute overlap areas of the individual time blocks with the overlap-add. The overall loudspeaker signal can also be referred to as the modified loudspeaker signal that can be synthesized by the apparatus based on the modified current diaphragm deflection signal block.

According to an embodiment, the apparatus can be configured to provide a current loudspeaker signal instead of the modified current loudspeaker signal block when a maximum deflection of the current time block does not exceed a maximum deflection limiting value. Thus, it is enabled that the apparatus checks first whether a modification or an attenuation is to be performed by the apparatus and the apparatus only performs the modification or the attenuation when the apparatus detects that the current loudspeaker signal could lead to diaphragm over-deflection without the modification or the attenuation. In that way, the apparatus can provide good mechanical protection for a loudspeaker in a very efficient way and with little power. Additionally, the sound quality is optimized since the loudspeaker signal is only modified or attenuated, e.g., when a possible diaphragm over-deflection is detected by the apparatus and otherwise the original loudspeaker signal can be provided by the apparatus or transmitted to the loudspeaker.

According to an embodiment, for attenuating the current diaphragm deflection signal block, the apparatus is configured to calculate one or several attenuation factors based on the level and to compute one or several attenuation factors with the current diaphragm deflection signal block. The current diaphragm deflection signal block should, e.g., not exceed the level, whereby the apparatus can calculate the attenuation factors such that, e.g., individual crossings of the current diaphragm deflection signal block or the complete diaphragm deflection signal block is attenuated by the apparatus such that the current diaphragm deflection signal block does not exceed the level. Thereby, it is additionally enabled that the attenuation factors can be selected such that the current diaphragm deflection signal block is exactly attenuated to the level, whereby a loudspeaker, to which the loudspeaker signal, synthesized by the apparatus, can be transmitted, can have a high performance since, e.g., a complete deflection of a diaphragm of the loudspeaker can be used.

According to an embodiment, the apparatus can be configured to compare the one or the several attenuation factors for the current time block with a version of the one or several attenuation factors for the preceding time block, reduced in attenuation strength by a predetermined fading-away function and to use a selected attenuation factor that is associated with a higher attenuation for the current time block of the same.

According to an embodiment, the apparatus can be configured to split the current diaphragm deflection signal block into a percussive signal portion and a harmonic signal portion and to determine the predetermined fading-away function in dependence on the percussive signal portion and/or the harmonic signal portion.

According to an embodiment, the predetermined fading-away function can comprise shorter time constants for the percussive signal portion than for the harmonic signal portion.

One embodiment provides a method for modifying a loudspeaker signal for preventing diaphragm over-deflection. The method comprises, for example, the following steps: block-by-block prediction of a diaphragm deflection signal in overlapping time blocks based on the loudspeaker signal to obtain one diaphragm deflection signal block per time block; determination of a temporal position of a maximum deflection of a current diaphragm deflection signal block of a current time block within an overlap area with a subsequent time block; calculation of a level up to which the current diaphragm deflection signal block can be controlled without diaphragm over-deflection for the current time block by considering a comparison of the current diaphragm deflection signal block with a subsequent diaphragm deflection signal block or an estimation of the subsequent diaphragm deflection signal block from the current diaphragm deflection signal block at the temporal position; attenuation of the current diaphragm deflection signal block based on the level to obtain a modified current diaphragm deflection signal block; and synthesization of a modified loudspeaker signal based on the modified current diaphragm deflection signal block.

One embodiment provides a method for modifying a loudspeaker signal for preventing diaphragm over-deflection. The method comprises, e.g., the following steps: block-by-block prediction of a diaphragm deflection signal in overlapping time blocks based on the loudspeaker signal to obtain one diaphragm deflection signal block per time block; determination of a first maximum deflection portion for a current diaphragm deflection signal block of a current time block in a first overlap area of the current time block with a preceding time block as well as in the residual area of the current diaphragm deflection signal block; determination of a second maximum deflection portion for the current diaphragm deflection signal block of the current time block in a second overlap area of the current time block with a subsequent time block; calculation of a level based on the first maximum deflection portion when the first maximum deflection portion is smaller than the second maximum deflection portion or calculation of the level based on the second maximum deflection portion when the second maximum deflection portion is smaller than the first maximum deflection portion; attenuation of the current diaphragm deflection signal block based on the level to obtain a modified current diaphragm deflection signal block; and synthesizing a modified loudspeaker signal based on the modified current diaphragm deflection signal block.

BRIEF DESCRIPTION OF THE DRAWINGS

Embodiments of the present invention will be detailed subsequently referring to the appended drawings, in which:

FIG. 6 is a block diagram of an adaptation of attenuation factors by means of the apparatus according to an embodiment of the present invention;

DETAILED DESCRIPTION OF THE INVENTION

Embodiments according to the present invention will be discussed in more detail below with reference to the accompanying drawings. Regarding the illustrated schematic figures, it should be noted that the illustrated functional blocks can be considered both as elements or features of the inventive apparatus and as respective method steps of the inventive method and respective method steps of the inventive method can also be derived therefrom. Before embodiments of the present invention will be discussed in more detail below with reference to the drawings, it should be noted that identical, functionally equal or equal elements, objects and/or structures in the different figures are provided with the same or similar reference numbers in the different figures such that the description of these elements illustrated in different embodiments is inter-exchangeable or inter-applicable.

Figure 1:
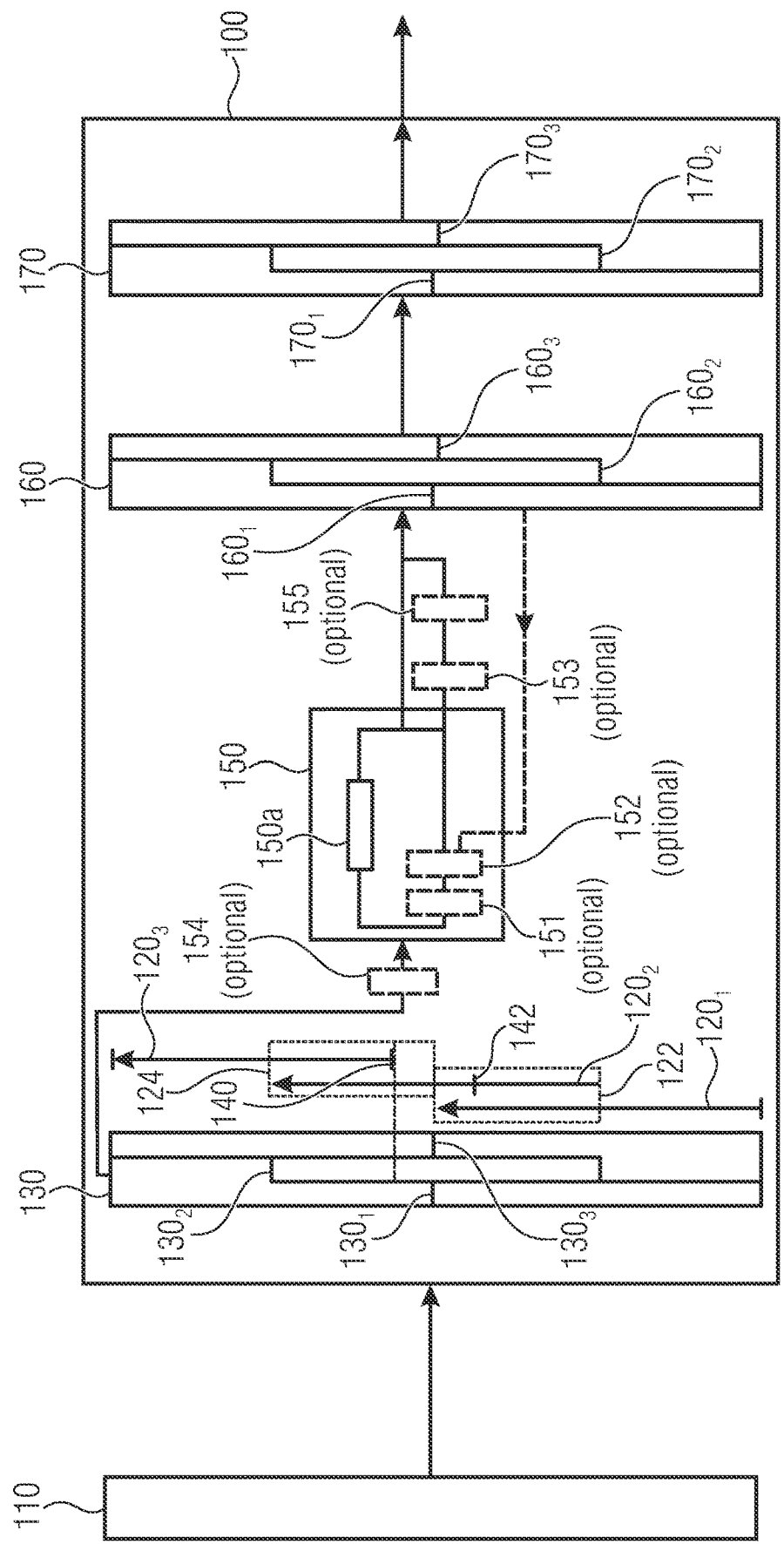
FIG. 1 is a schematic illustration of an apparatus according to an embodiment of the present invention.

FIG. 1 shows a schematic illustration of an apparatus 100 for modifying a loudspeaker signal 110 for preventing diaphragm over-deflection. The apparatus 100 can be configured to predict a diaphragm deflection signal 130 block-by-block in overlapping time blocks $120_1$ to $120_3$ based on the loudspeaker signal 110 to obtain one diaphragm deflection signal block $130_1$ to $130_3$ per time block $120_1$ to $120_3$. According to FIG. 1, for example, the apparatus 100 can obtain three diaphragm deflection signal blocks $130_1$ to $130_3$ for three time blocks $120_1$ to $120_3$. This is only an embodiment and it is possible that the apparatus 100 can predict the diaphragm deflection signal 130 with more overlapping time blocks $120_1$ to $120_3$ from the loudspeaker signal 110. In that way, for example, the apparatus 100 can predetermine that the time blocks $120_1$ to $120_3$ have a block size of 10 ms (block sizes of ≥5 ms, ≥8 ms order ≥10 ms are advantageous), whereby the apparatus 100 can obtain so many diaphragm deflection signal blocks $130_1$ to $130_3$ that the complete loudspeaker signal 110 (for example the complete time period of the loudspeaker signal 110) can be completely reflected by the time blocks $120_1$ to $120_3$ with a block length predetermined by the apparatus 100. In that way, for example, the diaphragm deflection signal 130 can define how much the loudspeaker signal 110 would deflect a diaphragm at a loudspeaker at any time.

Further, the apparatus 100 can be configured to determine a temporal position 140 of a maximum deflection of a current diaphragm deflection signal block $130_2$ of a current time block $120_2$ within an overlap area 124 with a subsequent time block $120_3$. In that way, the apparatus 100 can, for example, sample the current diaphragm deflection signal block $130_2$ for a maximum deflection within the overlap area 124 of the current time block $120_2$. This maximum deflection can result, for example, in diaphragm over-deflection when the apparatus 100 does not modify the diaphragm deflection signal 130.

The apparatus 100 can be configured to calculate (for example with the processing means 150), for the current time block $120_2$ by considering a comparison of the current diaphragm deflection signal block $130_2$ with a subsequent diaphragm deflection signal block $130_3$ or an estimation of the subsequent diaphragm deflection signal block $130_3$ from the current diaphragm deflection signal block $132_2$ at the temporal position, a level 150a up to which the current diaphragm deflection signal block $130_2$ can be controlled without diaphragm over-deflection. By the level 150a, the apparatus 100 can determine how much the current diaphragm deflection signal block $130_2$ should, for example, be attenuated to attenuate the current diaphragm deflection signal block $130_2$ in a ratio matching the subsequent diaphragm deflection signal block $130_3$, such that high sound quality can be maintained by the apparatus 100.

Further, the apparatus 100 can be configured to attenuate the current diaphragm deflection signal block $130_2$ based on the level 150a to obtain a modified current diaphragm deflection signal block $160_2$. The apparatus can perform this, for example, for each diaphragm deflection signal block $130_1$ to $130_3$ to obtain, for example, three modified diaphragm deflection signal blocks $160_1$ to $160_3$ according to FIG. 1. The modified diaphragm deflection signal blocks $160_1$ to $160_3$ can define a modified diaphragm deflection signal 160.

Further, the apparatus 100 can be configured to synthesize a modified loudspeaker signal.

Further, the apparatus 100 can be configured to synthesize a modified loudspeaker signal 170 based on the modified current diaphragm deflection signal block $160_2$. For this, the apparatus 100 can, for example, synthesize a modified loudspeaker signal block $170_1$, $170_2$ from each modified diaphragm deflection signal block $160_1$, $160_2$ and join them to the modified loudspeaker signal 170 by an overlap-add method. Alternatively, the apparatus 100 can be configured to first join the modified diaphragm deflection signal blocks $160_1$, $160_2$ to the modified diaphragm deflection signal 160 by the overlap-add method and to synthesize the complete modified loudspeaker signal 170 in one step from the modified diaphragm deflection signal 160. Optionally, the apparatus 100 can provide the loudspeaker signal 170 modified in that manner and transmit the same, for example, to a loudspeaker.

According to an embodiment, for calculating the level 150a, the apparatus 100 can be configured to determine a quotient between the current diaphragm deflection signal block $130_2$ at the temporal position 140 on the one hand and a sum of the subsequent diaphragm deflection signal block $130_3$ or the estimation of the subsequent diaphragm deflection signal block $130_3$ at the temporal position 140 and the current diaphragm deflection signal block $130_2$ at the temporal position 140 on the other hand. This step can be performed, for example, with the processing means 150. The quotient can define, for example, the relationship of the current diaphragm deflection signal block $130_2$ to the subsequent diaphragm deflection signal block $130_3$ at the temporal position 140. Accordingly, the level 150a calculated in that manner can define how much the current diaphragm deflection signal block $103_2$ is to be attenuated at least so that a high sound quality can be maintained while preventing diaphragm over-deflection.

According to an embodiment, the apparatus 100 can be configured to scale the quotient with a safety factor. This can, for example, cause strong attenuation of the diaphragm deflection signal 130, whereby mechanical protection of a diaphragm of a loudspeaker from diaphragm over-deflection can be increased. This step can be performed, for example, with the processing means 150.

According to an embodiment, the apparatus 100 can be configured to decompose the current diaphragm deflection signal block $130_2$ in at least one frequency band signal time block. This can take place, for example, with the processing means 150. In that way, the apparatus 100 can decompose the current diaphragm deflection signal block $130_2$ into at least one frequency band, wherein the at least one frequency band signal time block can represent a frequency band of the current diaphragm deflection signal block $130_2$ for the complete current time block $120_2$. Thus, the apparatus 100 can decompose the current diaphragm deflection signal block $130_2$ into several frequency band signal time blocks, which can each represent the complete current time block $120_2$ and a differing frequency band of the current diaphragm deflection signal block $130_2$. This feature enables the apparatus 100 to attenuate or modify the current diaphragm deflection signal block $130_2$ such that no or only few nonlinearities result in the modified current diaphragm deflection signal block $160_2$. Thereby, the apparatus 100 can ensure high sound quality. The feature described herein can represent, for example, a frequency band decomposition 151 by the processing means 150.

According to an embodiment, the apparatus 100 can be configured to determine at least one further temporal position 142 for each of the at least one frequency band signal time block, where a predetermined signal combination (e.g., of the current diaphragm deflection signal block $130_2$ with the preceding modified diaphragm deflection signal block $160_1$) exceeds a maximum deflection limiting value in the first overlap area 122 of the current time block $120_2$ with the preceding time block $120_1$ as well as in the residual time block $120_2$ (e.g., also in the overlap area 124). The predetermined signal combination can represent, for example, an overlap-add of the current diaphragm deflection signal block $130_2$ with the modified preceding diaphragm deflection signal block $160_1$ in the first overlap area 122. The maximum deflection limiting value can define, for example, from when on, e.g., an amplitude of the current diaphragm deflection signal block $130_2$ would result in diaphragm over-deflection when the apparatus 100 would not attenuate or modify the current diaphragm deflection signal block $130_2$. Thus, at least one further temporal position 142, which can also be referred to as critical temporal position, can be determined per frequency band signal time block, whereby the apparatus 100 can determine how the at least one frequency band signal time block should be modified or attenuated so that diaphragm over-deflection can be prevented, and hence good mechanical protection for loudspeakers can be ensured by the apparatus 100. This can take place, for example, by means of position determination 152 of the processing means 150.

According to an embodiment, the signal combination can include an additive combination of the current diaphragm deflection signal block $130_2$ with a modified preceding diaphragm deflection signal block $160_1$ and an additive combination of the respective frequency band signal time block with the modified preceding diaphragm deflection signal block $160_1$, and an additive combination of an amount of the current diaphragm deflection signal block $130_2$ with an amount of the modified preceding diaphragm deflection signal block $160_1$. Thus, e.g., at least one of the three additive combinations should exceed the maximum deflection limiting value at the further temporal position 142. The three additive combinations are based on the finding that deflection peaks (for example, maximum deflections) of a frequency band signal block cancel each other out in a superposition due to a phase position and can be invisible in the current diaphragm deflection signal block $130_2$. Further, with the three additive combinations, it can be considered that deflection peaks in high-frequency frequency band signal time blocks should be attenuated to a sufficient extent and deflection peaks in the current diaphragm deflection signal block $130_2$ may be smeared by close extremes in the individual frequency band signal time blocks. Thus, at least one further temporal position 142 where diaphragm over-deflection can occur and should hence be modified by the apparatus 100 can be determined with the apparatus 100 by the three additive combinations of the signal combination.

According to an embodiment, the apparatus 100 can be configured to determine an attenuation factor for each of the at least one frequency band signal time block based on the level 150a and the further temporal position 142 to attenuate the current diaphragm deflection signal block $130_2$. This can take place by attenuation factor determination 153. Thus, for example, the attenuation factor determination 153 can obtain the at least one further temporal position 142 per frequency band signal time block from the position determination 152 and can obtain the level 150a from the processing means 150. This can enable that, when optimizing the attenuation factors, usage of arbitrary start values can be prevented and instead deflection values can be used at the further temporal position 142, which can accelerate optimization. Thus, the apparatus 100 is configured to modify or attenuate the diaphragm deflection signal 130 very efficiently, e.g., while ensuring high sound quality, such that diaphragm over-deflection caused by the loudspeaker signal 110 can be prevented.

According to the embodiment, the apparatus 100 can be configured to compare the attenuation factor per frequency band signal time block for the current time block $120_2$ with a version of the attenuation factor per frequency band signal time block for the preceding time block $120_1$, reduced in attenuation strength by a predetermined fading-away function, and use a selected attenuation factor that can be associated with a higher attenuation for the current time block $120_2$ of the same. Thus, it can, for example, be considered that an attenuation of the preceding diaphragm deflection signal block $130_1$ can comprise a fading-away function that can also influence an attenuation of the current diaphragm deflection signal block $130_2$ by the apparatus 100, whereby, for example, the current diaphragm deflection signal block $130_2$, for example, reduced in attenuation strength with the attenuation factors by the predetermined fading-away function, can already be sufficiently attenuated to prevent diaphragm over-deflection. Thus, with this feature, the attenuation factors can be selected such that the current diaphragm deflection signal block $130_2$ is sufficiently attenuated by the apparatus 100 to prevent diaphragm over-deflection and hence to provide good mechanical protection for a loudspeaker by the apparatus 100. This can take place with the attenuation factor determination 153.

The apparatus 100 can, for example, attenuate the diaphragm deflection signal 130 with attack, hold and release functions. By short attack times, the current diaphragm deflection signal block $130_2$ can be attenuated very quickly, the attenuation can be held for a short time by means of the hold function and can be released again with the release function. In that way, for example, an attack time of 0 seconds can be used so that the modified loudspeaker signal 107 that can be provided by the apparatus 100 does not comprise any non-attenuated diaphragm deflection amplitudes that could result in diaphragm over-deflection. The release time can depend on the determined attenuation factors. In that way, for example, long sounds may need long time constants to cause no modulation and percussion-like sounds may need rather short time constants. The release time can monitor the attenuation factors of the individual frequency band signal time blocks by comparing the attenuation factors of the current time block $120_2$ with the version of the attenuation factors of the preceding time block $120_1$, reduced in attenuation strength by a predetermined fading-away function. If, for example, the diaphragm deflection of the current diaphragm deflection signal block $130_2$ increases, the attenuation factors can be adapted such that diaphragm over-deflection can be prevented. This can take place with the attenuation factor determination 153.

According to an embodiment, the apparatus 100 can be configured to split the current diaphragm deflection signal block $130_2$ into a percussive signal portion and a harmonic signal portion, and to determine the predetermined fading-away function in dependence on the percussive signal portion and/or the harmonic signal portion. This can take place, for example, with the diaphragm deflection signal splitting 154 prior to the frequency band decomposition 151. This feature can improve the sound quality, since, for example, shorter time constants of the predetermined fading-away function are better suited for percussive signals and longer time constants, e.g., for harmonic signals. The split into the percussive signal portion and the harmonic signal portion can take place, for example, for the complete current diaphragm deflection signal block $130_2$ or for each frequency band signal time block of the current diaphragm deflection signal block $130_2$.

According to an embodiment, the apparatus 100 can be configured to calculate, for each of the at least one further temporal position 142, a first maximum deflection portion for the current time block $120_2$ by considering the maximum deflection limiting value and the modified preceding diaphragm deflection signal block $160_1$. This maximum deflection portion can determine for the current diaphragm deflection signal block $130_2$, how much the current diaphragm deflection signal block $130_2$ should still be attenuated by the apparatus 100, so that no diaphragm over-deflection is caused in an overlap-add of the overlap area 122, and hence the modified preceding diaphragm deflection signal block $130_1$ can also be considered. This can take place with the processing means 150.

According to an embodiment, the apparatus 100 can be configured to calculate the first maximum deflection portion from a quotient between a difference of the maximum deflection limiting value, wherein a sign of the maximum deflection limiting value can depend on the current diaphragm deflection signal block $130_2$ at the further temporal position 142 and the modified preceding diaphragm deflection signal block $160_1$ on the one hand, and the maximum deflection limiting value on the other hand. This can take place with the processing means 150.

According to an embodiment, the apparatus 100 can be configured to calculate a modified current loudspeaker signal block $170_2$ from the modified current diaphragm deflection signal block $160_2$ and to subject the modified current loudspeaker signal block $170_2$ to an overlap-add with the modified preceding loudspeaker signal block $170_1$ to synthesize a modified loudspeaker signal 170. When calculating the current loudspeaker signal block $170_2$, for example, no subsequent modified loudspeaker signal block $170_3$ exists. Thus, an output to a loudspeaker can be, for example, the overlap of the preceding modified loudspeaker signal block $170_1$ with a first part of the current modified loudspeaker signal block $170_2$, wherein the first part can be, for example, an overlap area 122 of the current time block $120_2$ with the preceding time block $120_1$.

According to an embodiment, the apparatus 100 can be configured to provide a current loudspeaker signal 110 instead of the modified current loudspeaker signal block $170_2$ when a maximum deflection of the current diaphragm deflection signal block $130_2$ of the current time block $120_2$ does not exceed a maximum deflection limiting value. Thus, the apparatus 100 can very efficiently protect a loudspeaker from diaphragm over-deflection by attenuating or modifying the current loudspeaker signal 110 only when the apparatus 100 detects that diaphragm over-deflection can be caused at the loudspeaker by the current loudspeaker signal 110.

According to an embodiment, for attenuating the current diaphragm deflection signal block $130_2$, the apparatus 100 can be configured to calculate one or several attenuation factors based on the level 150*a* (e.g., with the attenuation factor determination 153) and to compute the one or several attenuation factors with the current diaphragm deflection signal block $130_2$. With a computing means 155, the one or several attenuation factors can be computed with the current diaphragm deflection signal block $130_2$ such that a modified current diaphragm deflection signal block $160_2$ can be determined, which should not result in diaphragm over-deflection.

Figure 2:
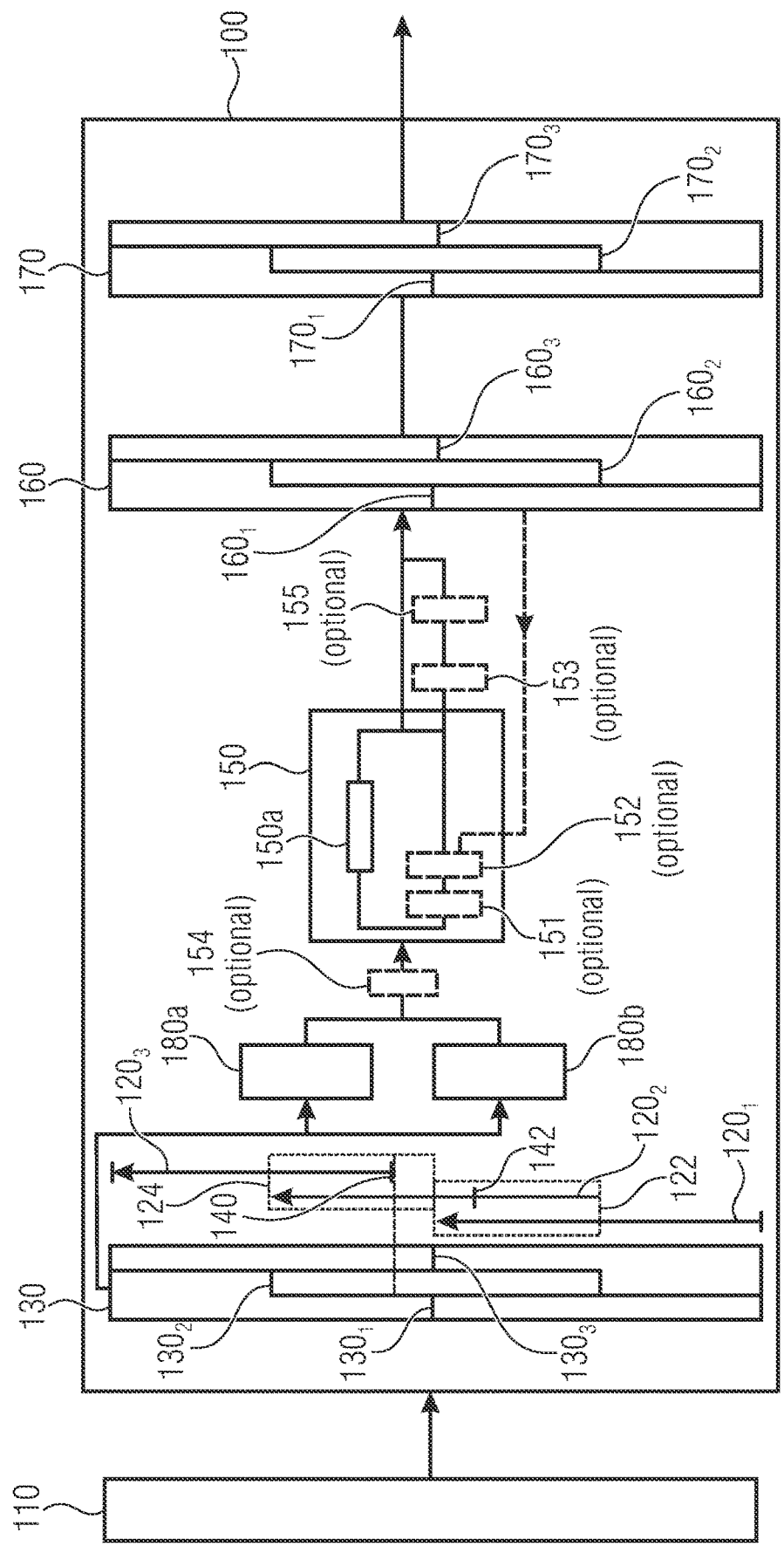
FIG. 2 is a schematic illustration of an apparatus for calculating a first and a second maximum deflection portion according to an embodiment of the present invention.

FIG. 2 shows a schematic illustration of an apparatus 100 for modifying a loudspeaker signal 110 for preventing diaphragm over-deflection, which can comprise features and functionalities according to the apparatus 100 of FIG. 1. Further, the apparatus 100 can be configured to determine a first maximum deflection portion 180*a* for a current diaphragm deflection signal block $130_2$ of a current time block $120_2$ in a first overlap area 142 of a current time block $120_2$ (e.g., the current diaphragm deflection signal block $130_2$) with a preceding time block $120_1$ as well as in the residual area of the current diaphragm deflection signal block $130_2$. Thus, it can be determined for the entire current time block $120_2$ how much the apparatus 100 should at least attenuate the current diaphragm deflection signal block $130_2$, so that, for example, for an overlap-add of the current modified diaphragm deflection signal block $160_2$ with the preceding modified diaphragm deflection signal block $160_1$, no diaphragm over-deflection is caused at a loudspeaker. Thus, the maximum deflection portion can indicate how large a portion of the current diaphragm deflection signal block $130_2$ may be of a maximum deflection limiting value so that the maximum deflection limiting value is not exceeded and hence, diaphragm over-deflection may be caused. Here, the maximum deflection limiting value can define how large a deflection after an overlap-add of the current modified diaphragm deflection signal block $160_2$ and the preceding modified diaphragm deflection signal block $160_1$ may be at most so that no diaphragm over-deflection results. A ratio of the first maximum deflection portion 180*a* to a residual deflection portion (e.g., a deflection portion of the preceding modified diaphragm deflection signal block $160_1$ of the maximum deflection limiting value) can, for example, be selected such that high sound quality can be obtained.

Additionally, the apparatus 100 can be configured to determine a second maximum deflection portion 180*b* for the current diaphragm deflection signal block $130_2$ of the current time block $120_2$ in a second overlap area 124 of the current time block $120_2$ with a subsequent time block $120_3$. With this feature, the apparatus 100 is able to attenuate or modify the current diaphragm deflection signal block $130_2$ already in a look-ahead manner. Thus, the apparatus 100 can determine, for example, the relationship of the current diaphragm deflection signal block $130_2$ to the subsequent diaphragm deflection signal block $130_3$ and, accordingly, attenuate the current diaphragm deflection signal block $130_2$, whereby high sound quality can be obtained. The second maximum deflection portion 180*b* can have this relationship.

Further, the apparatus 100 can be configured to calculate a level 150*a* based on the first maximum deflection portion 180*a* when the first maximum deflection portion 180*a* is smaller than the second maximum deflection portion 180*b*, or to calculate the level 150*a* based on the second maximum deflection portion 180*b* when the second maximum deflection portion 180*b* is smaller than the first maximum deflection portion 180*a*. Thus, the apparatus 100 is configured, for example, to determine a greater attenuation based on the first maximum deflection portion 180*a* and the second maximum deflection portion 180*b* and to select the same to attenuate the diaphragm deflection signal 130 to ensure that a modified diaphragm deflection signal 160 cannot result in diaphragm over-deflection. This takes place, e.g., by a processing means 150.

According to an embodiment, the apparatus 100 can be configured to calculate the level 150a based on the first maximum deflection portion 180a by means of a product of the maximum deflection limiting value and the first maximum deflection portion 180a, or to calculate the level 150a based on the second maximum deflection portion 180b by means of a product of the maximum deflection limiting value and the second maximum deflection portion 180b. Thus, the level 150a can define a maximum amplitude, which the current diaphragm deflection signal block $130_2$ may have at maximum. Thus, the current diaphragm deflection signal block $130_2$ may not exceed the level 150a. Level calculation takes place, for example, via the processing means 150. With the level 150a, the apparatus 100 can check whether the current diaphragm deflection signal block $130_2$ should be modified or attenuated or can be provided without any further processing.

According to an embodiment, the apparatus 100 can be configured to determine a temporal position 140 of a maximum deflection of the current diaphragm deflection signal block $130_2$ of the current time block $120_2$ within the second overlap area 124 with the subsequent time block $120_3$; and to determine, for the second maximum deflection portion 180b, a quotient between the current diaphragm deflection signal block $130_2$ at the temporal position 140 on the one hand and a sum of a subsequent diaphragm deflection signal block $130_3$ or an estimation of the subsequent diaphragm deflection signal block $130_3$ at the temporal position 140, based on the current diaphragm deflection signal block $130_2$ of the current time block $120_2$, and the current diaphragm deflection signal block $130_2$ at the temporal position 140 on the other hand. According to an embodiment, the apparatus 100 can be configured to scale the quotient with a safety factor. The temporal position can be determined, for example, via the processing means 150.

According to an embodiment, the apparatus 100 can be configured to estimate the second maximum deflection portion 180b based on the current diaphragm deflection signal block $130_2$. Thus, for example, to determine the second maximum deflection portion 180b, not the subsequent diaphragm deflection signal block $130_3$ but only the current diaphragm deflection signal block $130_2$ is needed. This improves the efficiency of the apparatus 100 for modifying the diaphragm deflection signal 130 to prevent diaphragm over-deflection.

According to an embodiment, the apparatus 100 can be configured to estimate the second maximum deflection portion 180b based on the current diaphragm deflection signal block $130_2$ by means of a neural network. By using a neural network, the apparatus 100 can be trained and thereby not only very efficiently perform modification of the diaphragm deflection signal 130, but additionally realize very exact modification that can result in efficiency increase/a faster algorithm.

Figure 3:
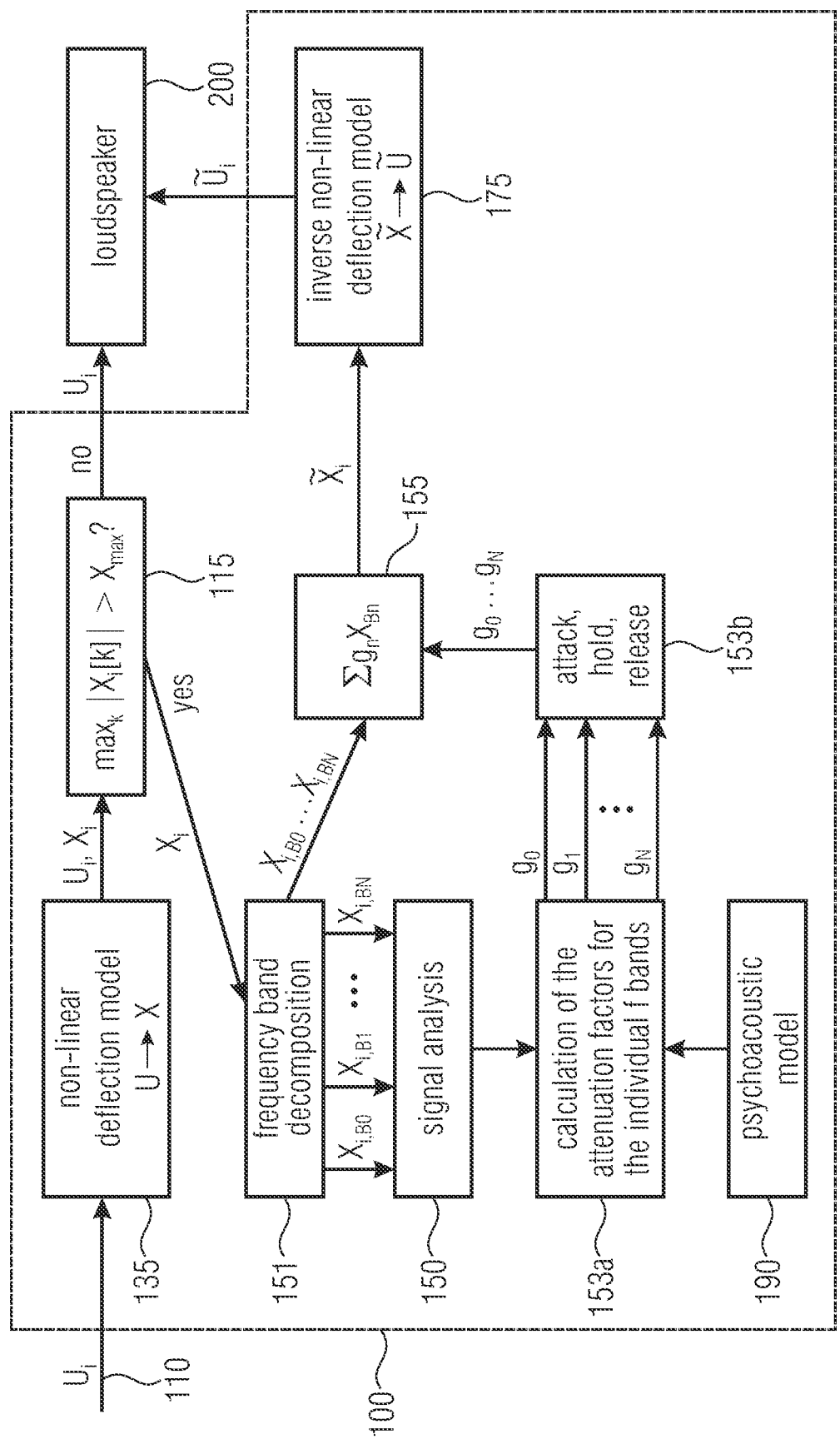
FIG. 3 is a block diagram of an overall signal flow in the apparatus according to an embodiment of the present invention.

FIG. 3 shows an embodiment of the apparatus 100, in other words, e.g., an overall signal flow in a deflection limiter (e.g., the apparatus 100).

In the following, the apparatus 100 can also be referred to as deflection limiter. According to an embodiment, the apparatus 100 can be configured to modify a loudspeaker signal U, 110 to prevent diaphragm over-deflection, e.g., $X > X_{max}$, to predict 135 a diaphragm deflection signal X block-by-block in overlapping time blocks based on the loudspeaker signal U, 110 to obtain one diaphragm deflection signal block $X_i$ per time block. Here, e.g., the complete loudspeaker signal U, 110 can be detected by the apparatus 100 or block-by-block in overlapping time blocks. In that way, a current loudspeaker signal of a current time block can be referred to, for example, as $U_i$ and $X_i$ can be a current diaphragm deflection signal block of a same time block. Here, i can be a positive integer. The diaphragm deflection signal X can have the same features and functionalities as the diaphragm deflection signal 130 of FIG. 1 or FIG. 2, and the current diaphragm deflection signal block $X_i$ can have the same features and functionalities as the diaphragm deflection signal block $130_2$ of FIG. 1 or FIG. 2. Predicting 135 the diaphragm deflection signal X can take place, for example by means of a non-linear deflection model.

The apparatus 100 can be configured to determine a temporal position $k_0$ of a maximum deflection $X_i[k_0]$ of a current diaphragm deflection signal block $X_i$ of a current time block i within an overlap area with a subsequent time block i+1. This takes place, e.g., in the signal analysis 150.

The apparatus 100 can be configured to calculate a level (e.g., $h_i X_{max}$) up to which the current diaphragm deflection signal block $X_i$ can be deflected without diaphragm over-deflection for the current time block i by considering a comparison of the current diaphragm deflection signal block (e.g., $X_i[k_0]$) with a subsequent diaphragm deflection signal block (e.g., $X_{i+1}[k_0-M_{step}]$) or an estimation of the subsequent diaphragm deflection signal block (e.g., $X_{i+1}[k_0-M_{step}]$) from the current diaphragm deflection signal block $X_i$ at the temporal position (e.g., $k_0$) in the current time block i and $k_0-M_{step}$ in the subsequent time block i+1, wherein $k_0$ and $k_0-M_{step}$ represent the corresponding point in time for the respective diaphragm deflection signal block in the overlap area of the two time blocks. This can take place in the signal analysis 150.

Further, the apparatus 100 can be configured to attenuate the current diaphragm deflection signal block $X_i$ based on the level ($h_i X_{max}$) to obtain a modified current diaphragm deflection signal block $\tilde{X}_i$. This can take place with the computing unit 155.

Further, the apparatus 100 can be configured to synthesize 175 a modified loudspeaker signal $\tilde{U}$ based on the modified current diaphragm deflection signal block $\tilde{X}_i$. Here, for example, the complete modified loudspeaker signal $\tilde{U}$ can be synthesized 175 based on a completely modified diaphragm deflection signal $\tilde{U}$ or block-by-block in overlapping time blocks, such that a current modified loudspeaker signal $\tilde{U}_i$ is synthesized 175, for example, based on the current modified diaphragm deflection signal block $\tilde{X}_i$ of a same time block. Here, i can be a positive integer and can comprise the complete modified diaphragm deflection signal $\tilde{X}$ of the current diaphragm deflection signal block $\tilde{X}_i$. The modified diaphragm deflection signal $\tilde{X}$ can have the same features and functionalities as the modified diaphragm deflection signal 160 of FIG. 1 or FIG. 2, the current modified diaphragm deflection signal block $\tilde{X}_i$ can have the same features and functionalities as the current modified diaphragm deflection signal block $160_2$ of FIG. 1 or FIG. 2, the modified loudspeaker signal $\tilde{U}$ can have the same features and functionalities as the modified loudspeaker signal 170 of FIG. 1 or FIG. 2, and the current modified loudspeaker signal $\tilde{U}_i$ can have the same features and functionalities as the current modified loudspeaker signal $170_2$ of FIG. 1 or FIG. 2. Synthesizing 175 the modified loudspeaker signal $\tilde{U}$ can take place, e.g., by means of an inverse nonlinear deflection model. Optionally, the apparatus 100 can transmit the modified loudspeaker signal $\tilde{U}$ or the current modified loudspeaker signal $\tilde{U}_i$ to a loudspeaker 200.

Optionally, the apparatus 100 can be configured to a current loudspeaker signal $U_i$ provide instead of the modified current loudspeaker signal block $\tilde{U}_i$ and to transmit the same, e.g., to the loudspeaker 200 when a maximum deflection of the current diaphragm deflection signal block $X_i$ of the current time block i does not exceed a maximum deflection limiting value $X_{max}$ [e.g. $\max_k|X_i[k]|<X_{max}$], which the apparatus 100 can perform by a query 115.

Further, the apparatus 100 can be configured to decompose the current diaphragm deflection signal block ($X_i$) into at least one frequency band signal time block ($X_{i,B0}$ to $X_{i,BN}$, with N frequency band signal time blocks, wherein N is a positive integer) with a frequency band decomposition 151.

According to an embodiment, the apparatus can be configured to determine, for each of the at least one frequency band signal time blocks $X_{i,B0}$ to $X_{i,BN}$, at least one further temporal position where a predetermined signal combination exceeds a maximum deflection limiting value $X_{max}$ in the first overlap area of the current time block i with the preceding time block i−1 as well as in the reciprocal time block i. This takes place, e.g., by means of the signal analysis 150.

According to an embodiment, the apparatus 100 can be configured to determine an attenuation factor $g_0$ to $g_N$ for each of the at least one frequency band signal time block $X_{i,B0}$ to $X_{i,BN}$, based on the level $h_iX_{max}$ and the further temporal position to attenuate the current diaphragm deflection signal block $X_i$. This takes place, e.g., by means of the attenuation factor determination 153a.

According to an embodiment, the apparatus 100 can be configured to compare an attenuation factor $g_0$ to $g_N$ per frequency band signal time block $X_{i,B0}$ to $X_{i,BN}$ for the current time block i with a version of the attenuation factor $g_0$ to $g_N$ per frequency band signal time block $X_{i,B0}$ to $X_{i,BN}$ for the preceding time block i−1, reduced in attenuation strength by a predetermined fading-away function, and to use a selected attenuation factor $g_0$ to $g_N$ that is associated with a higher attenuation for the current time block of the same. This takes place, e.g., via the attack, hold and release functions 153b. If it applies according to an embodiment that a current $g_N$ is smaller than an old $g_N$, the attack, hold and release functions 153b should select the current $g_N$, otherwise the release function should still be followed, wherein, for example, a higher attenuation factor $g_N$ can cause less attenuation. According to an embodiment, an attenuation factor g=1 can define an attenuation of 0 dB and an attenuation factor g=0.1 can define an attenuation of 20 dB.

According to an embodiment, the attenuation factor determination 153a and the attack, hold and release functions 153b can have the same features and functionalities as the attenuation factor determination 153 of FIG. 1 or FIG. 2.

Optionally, the attenuation factor determination 153a can use a psychoacoustic model 190 to optimize determination of the attenuation factors $g_0$ to $g_N$ and to thereby improve the sound quality of the modified loudspeaker signal $\tilde{U}$ or the current loudspeaker signal block $\tilde{U}_i$.

Thereby, the embodiment illustrated in FIG. 3 can represent an intelligent signal analysis 150, both of an overall deflection (e.g., of the current diaphragm deflection signal block ($X_i$) as well as the deflection in the respective frequency bands (e.g., in the individual frequency band signal time blocks $X_{i,B0}$ to $X_{i,BN}$), which can provide for the fact that the deflection limiting value $X_{max}$ can be approximated without unnecessary headroom. Headroom means an unused portion of a maximum deflection of a diaphragm of the loudspeaker 200. Thus, when a headroom exists, the diaphragm is hardly or never completely deflected. If the headroom is too large, no high performance can be obtained at the loudspeaker. The apparatus causes, e.g., only a very small or no headroom, whereby a very high performance of the loudspeaker 200 can be obtained. Further, FIG. 3 can represent a system that can combine the best partial approaches to an optimum overall system and can comprise a separate attack, hold and release regulation 153b for percussive and harmonic signal portions, which result in an improvement of the sound quality.

Preprocessing

In other words, FIG. 3 shows an embodiment of a basic signal flow in the inventive deflection limiter 100. An input voltage U (e.g., the loudspeaker signal U, 110) is input, e.g., block-by-block (e.g., in time blocks i) into the system (e.g., the apparatus 100). The time blocks i can have a common temporal block size that defines, e.g., the length of a time block i. Block sizes ≥10 ms have proven to be particularly good. Block sizes of ≥50 μs, ≥1 ms, ≥5 ms, ≥12 ms, ≥15 ms, ≥20 ms oder ≥50 ms are also possible. A voltage curve in the i-th block can be referred to as $U_i$. The voltage curve in the i-th block can be an example for the current loudspeaker signal block $U_i$ in the current time block i.

For increasing a velocity of subsequent processing steps, low-pass filtering and undersampling may be performed, as high frequencies are hardly relevant for diaphragm deflection.

The voltage $U_i$ is used, e.g., as input signal of a non-linear deflection model for prediction 135 of the deflection $X_i$ (the current diaphragm deflection signal block $X_i$). The deflection model allows control without feedback path. Possible embodiments of the deflection models are a simple filter, a physical structural model (e.g., implemented in the state space) or a machine-learning model (e.g., neural network). The deflection model is not limited to a specific actuator principle—models for electrodynamic loudspeakers, piezoelectric loudspeakers, and electrostatic loudspeakers can be used in a modular manner. Additionally, the deflection model can be implemented in an adaptive i.e. time-variable manner to adapt the parameters continuously to the loudspeaker in an optimum way. In this case, the apparatus can comprise a feedback path. All listings of the deflection models and actuator principles stated herein are to be considered as exemplary and not limiting.

If the predicted deflection (e.g., an amplitude of the current diaphragm deflection signal block $X_i$) does not exceed the limiting value $X_{max}$, the input signal is passed on directly to the loudspeaker. Otherwise, the predicted deflection signal is, e.g., processed further and decomposed into N≥1 adjacent frequency bands (e.g., the frequency band signal blocks $X_{i,B0}$ to $X_{i,BN}$). This corresponds, for example, to the mode of operation of a filterbank. Possible implementations are, for example, adjacent band pass filters or also perfect reconstruction filterbanks like MDCT (modified discrete cosine transformation) or PQMF (pseudo quadrature mirror filters). It should be considered that this filterbank (e.g., the frequency band decomposition 151) and the psychoacoustic model 190 should consider the same frequency bands. All listings of the methods for decomposing the predicted deflection signal $X_i$ into adjacent frequency bands (B0 to BN, wherein N is, for example, a natural number between 1 and 100) stated herein are to be considered as exemplary and not limiting.

Signal Analysis and Calculation of the Attenuation Factors

First, e.g., a signal analysis 150 is performed by using all time signals of the individual frequency bands $X_{i,Bn}$ (wherein N is a natural number between 0 and N) as well as the overall deflection signals $\tilde{X}_{i-1}$, $X_i$ and possibly $X_{i+1}$ (wherein $\tilde{X}_{i-1}$ defines, e.g., a modified overall deflection signal of the time block i−1 preceding the current time block i). A block diagram for a possible embodiment is illustrated in FIG. 4.

Figure 4:
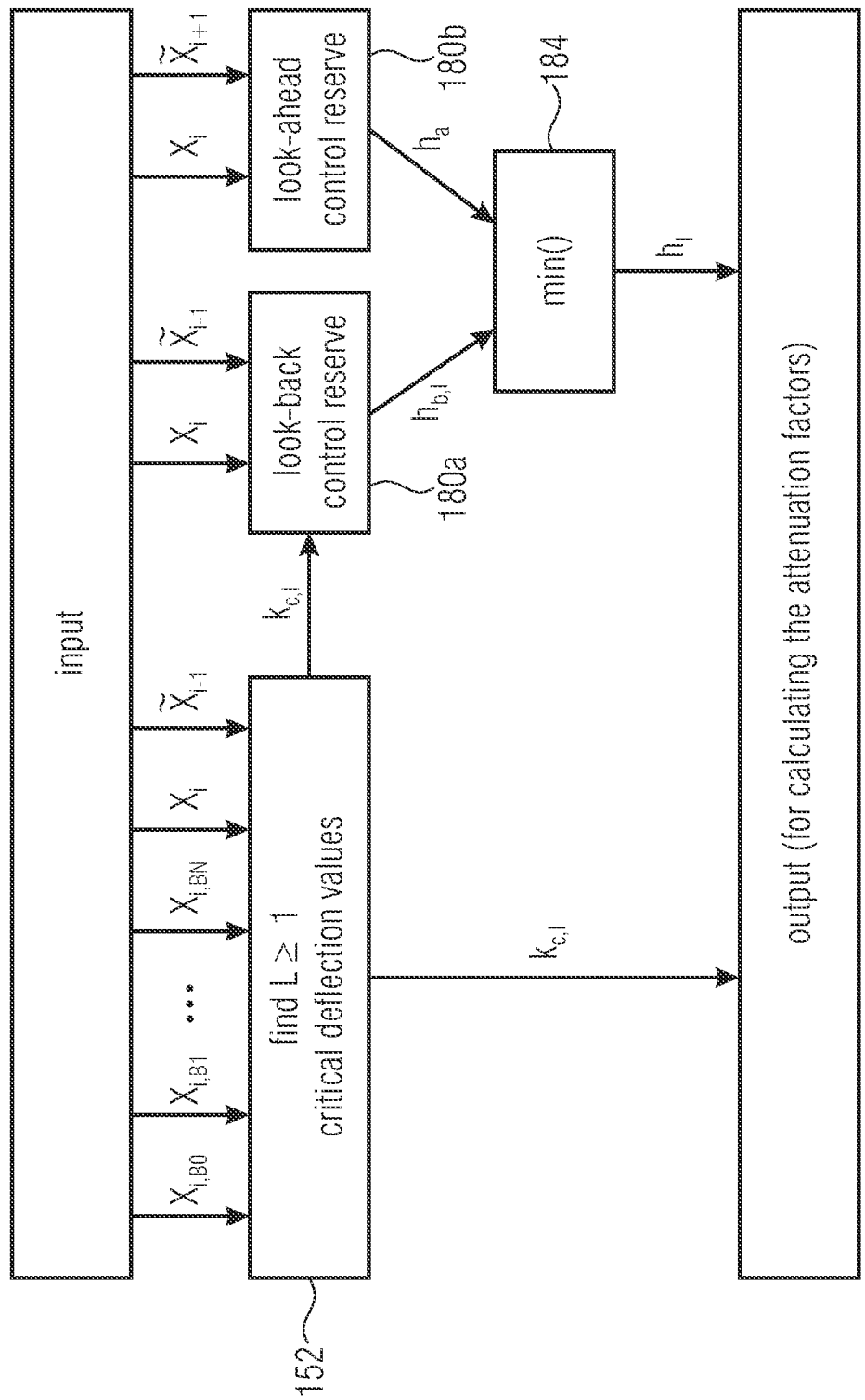
FIG. 4 is a block diagram of a signal analysis of the apparatus according to an embodiment of the present invention.

FIG. 4 shows a block diagram illustrating a signal flow, e.g., of the apparatus in the signal analysis that can comprise the same features and functionalities as the processing means 150 of FIG. 1 or FIG. 2 and as the signal analysis 150 of FIG. 3.

Figure 5C:
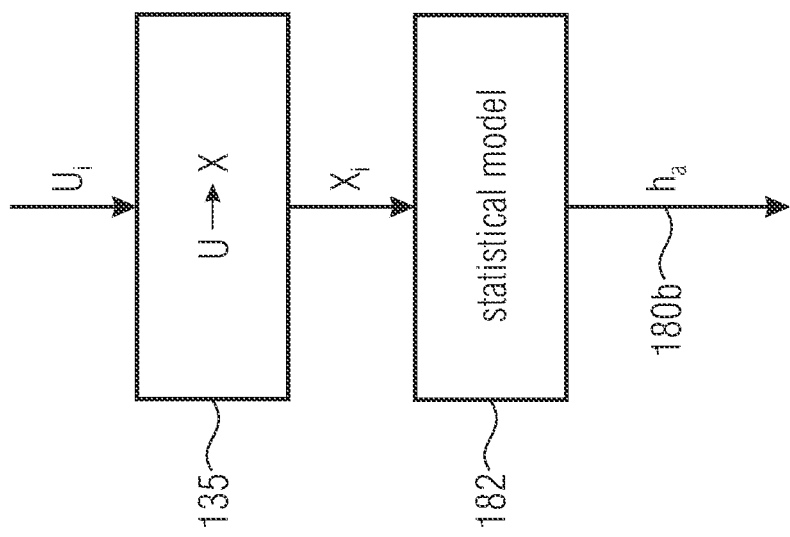
FIG. 5c is a block diagram of an estimation of a second maximum deflection portion with the apparatus according to an embodiment of the present invention.
Figure 5B:
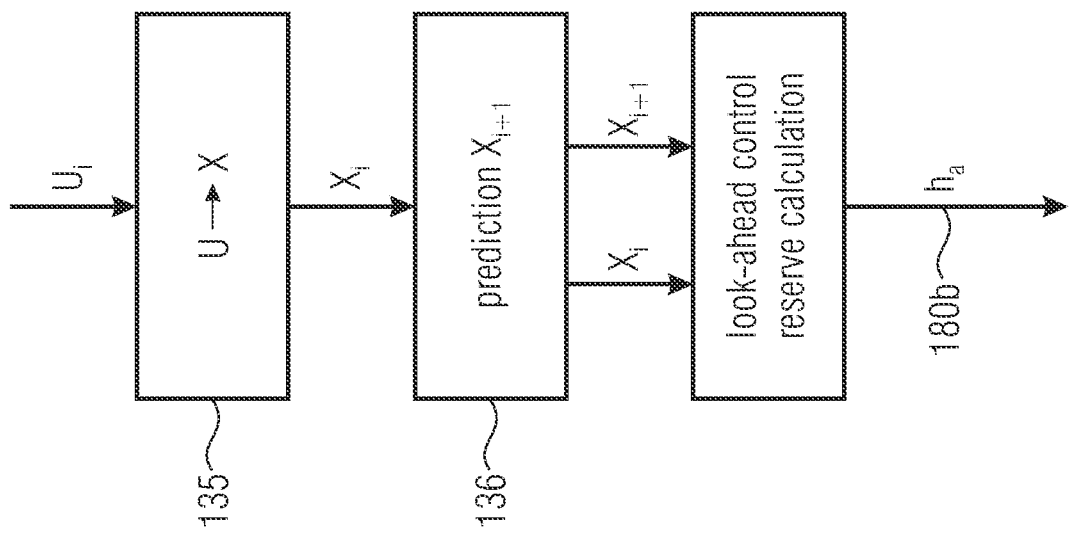
FIG. 5b is a block diagram of a calculation of a second maximum deflection portion with an estimation of a subsequent diaphragm deflection signal block by means of the apparatus according to an embodiment of the present invention.
Figure 5A:
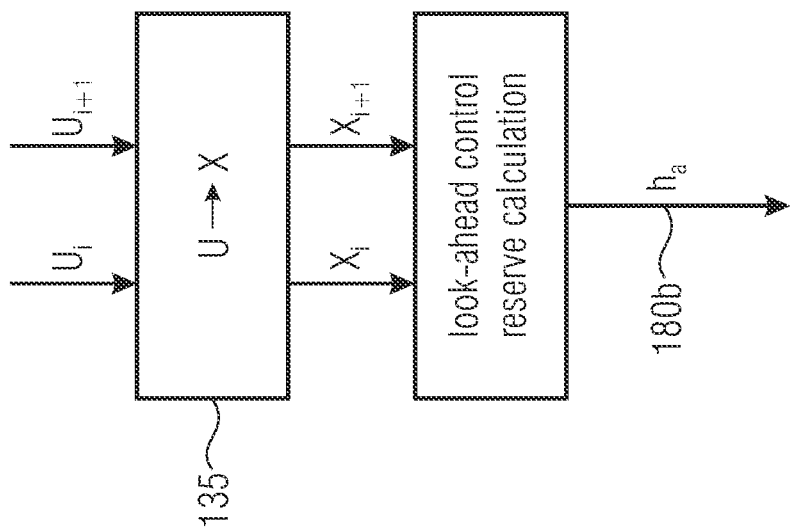
FIG. 5a is a block diagram of a calculation of a second maximum deflection portion with the apparatus according to an embodiment of the present invention.

First, e.g., based on an overlap-add processing, it is considered how much the overall current block i should at least be attenuated so that $X_{max}$ is not exceeded in the overlap area with the subsequent block i+1. Here, it should be noted that the subsequent block i+1 is not attenuated too much. The latter measure is not needed to guarantee the protection of the transducer but to maximize the sound quality. Therefore, the look-ahead headroom $h_a$ (e.g., the second maximum deflection portion 180b, $h_a$) is calculated, e.g., by $$k_o = \mathrm{argmax}|X_i[M_{step} \ldots M_{block}]|$$
$$h_a = \frac{X_i[k_o]}{X_i[k_o] + X_{i+1}[k_o - M_{step}]} s \bigg| s \in [0; 1]$$

wherein $X_i$ can represent the time signal of the overall deflection in the i-th signal block (e.g., the current diaphragm deflection signal block), $M_{block}$ the block length and $M_{step}$ the step width of the overlap-add signal processing and s a parametric safety factor. In the following, the second maximum deflection portion 180b, $h_a$ can also be referred to as look-ahead headroom. By the look-ahead, e.g., the signal delay increases by $M_{step}$ samples. A respective prediction model for the future deflection curve (e.g., the subsequent diaphragm deflection signal block $X_{i+1}$) based on the current signal curve (e.g., the current diaphragm deflection signal block $X_{i+1}$), e.g., by means of a neural network or a statistic model for direct prediction of $h_a$ based on the current signal block (e.g., the current diaphragm deflection signal block $X_i$), could eliminate the consideration of the second signal block (e.g., the subsequent diaphragm deflection signal block $X_{i+1}$). FIG. 5a, FIG. 5b and FIG. 5c illustrate possible embodiments of the look-ahead headroom calculation 180b.

FIG. 5a, FIG. 5b and FIG. 5c show embodiments of the look-ahead headroom calculation. By calculating the future signal curve (see FIG. 5a) with the estimation of the future signal curve based on the current signal block (see FIG. 5b) with direct estimation of the look-ahead headroom $h_a$ based on the current signal curve (see FIG. 5c).

Thus, FIG. 5a shows, e.g., a calculation of the second maximum deflection portion 180b, $h_a$ based on a prediction 135 of the current diaphragm deflection signal block $X_i$ based on the current loudspeaker signal $U_i$ and the subsequent diaphragm deflection signal block $X_{i+1}$ based on the subsequent loudspeaker signal wherein the prediction 135 takes place, e.g., by means of a non-linear deflection model. Thus, the apparatus 100 can determine exactly how much the current diaphragm deflection signal block $X_i$ should be attenuated so that a high mechanical protection of a transducer (e.g., diaphragm, suspension) of the loudspeaker 200 can be ensured by the apparatus.

FIG. 5b shows, e.g., a calculation of the second maximum deflection portion 180b, $h_a$, wherein the subsequent diaphragm deflection signal block $X_{i+1}$ is estimated 136 based on the current diaphragm deflection signal block $X_i$, whereby the second maximum deflection portion 180b, $h_a$ can be calculated faster and, hence, more efficiently. The second maximum deflection portion 180b, $h_a$ can be determined by means of the apparatus from the current diaphragm deflection signal block $X_i$ and the estimated subsequent diaphragm deflection signal block $X_{i+1}$. The estimation 136 of the subsequent diaphragm deflection signal block $X_{i+1}$ can take place, e.g., via a neural network.

FIG. 5c shows, e.g., a calculation of the second maximum deflection portion 180b, $h_a$, wherein the second maximum deflection portion 180b, $h_a$ is estimated 182 based on the current diaphragm deflection signal block $X_i$. Thus, the second maximum deflection portion 180b, $h_a$ can be calculated even faster and more efficiently, as the subsequent diaphragm deflection signal block $X_{i+1}$ is not needed for the calculation. The estimation 182 can take place, e.g., via a neural network.

The calculation of the look-ahead headroom $h_a$ is explicitly not based on the subsequent signal analysis steps, i.e. the same can take place separately with the respective input signals.

According to FIG. 4, a next step in the signal analysis 150 according to an embodiment can include the identification of critical deflection values 152 in the predicted signals (e.g., the diaphragm deflection signal X, such as $X_i$ and $X_{i+1}$ or the frequency band signal blocks $X_{i,B0}$ to $X_{i,BN}$), which can later serve to calculate the attenuation factors for the individual frequency bands.

For searching the critical deflection values 152 (or further temporal positions), e.g., three different signal combinations (e.g., additive combinations) can be used:
1. $X_{alt} + X_i$,
2. $X_{alt} + X_{i,B0} \ldots X_{alt} + X_{i,BN}$,
3. $|X_{alt}| + |X_i|$, wherein $$X_{alt}[k] = \begin{cases} \tilde{X}_{i-1}[k + M_{step}], & k < M_{block} - M_{step} \\ 0, & k \geq M_{block} - M_{step} \end{cases},$$

In the three signal combinations, e.g., all extremes exceeding the deflection limit $X_{max}$ are identified as critical deflection values. In that way, e.g., L critical deflection values and their indices $k_{c,l}$ with $0 \leq l \leq L$ are found. The critical deflection values serve to prevent optimization of the attenuation factors with random start values, which accelerates the algorithm.

In the following, a look-back headroom 180a can be a first maximum deflection portion. According to an embodiment, a processing loop having L iterations starts. Here, first the look-back headroom is calculated, e.g., for the l-th critical deflection value having the index $k_{c,l}$, i.e., how large the overall attenuation of the current block i should at least be so that the overlap with the preceding already processed block i−1 does not result in exceeding the limiting value $X_{max}$. The look-back headroom for the l-th critical deflection value $h_{b,l}$ is calculated, e.g., by:

$$h_{b,l} = \frac{\mathrm{sign}(X_i[k_{c,l}]) X_{max} - X_{alt}[k_{c,l}]}{X_{max}}$$

A final headroom $h_l$, 184 for the l-th critical deflection value is calculated, e.g., as $$h_l = \text{sign}(X_l[k_{c,l}])\min(|h_{b,l}|, |h_a|).$$

Thus, according to an embodiment, the apparatus can be configured to calculate a level ($h_l X_{max}$) based on the first maximum deflection portion ($h_{b,l}$) when the first maximum deflection portion ($h_a$) is smaller than the second maximum deflection portion ($h_a$), or to calculate the level ($h_l X_{max}$) based on the second maximum deflection portion ($h_a$) when the second maximum deflection portion ($h_a$) is smaller than the first maximum deflection portion ($h_{b,l}$).

FIG. 4 shows, e.g., the signal analysis 150 of FIG. 3 in detail.

According to FIG. 3, for each of the N frequency bands, e.g., a linear attenuation factor $g_0$ to $g_N$ can be calculated by means of the attenuation factor determination 153*a* (here, linear means, e.g., that no additional nonlinearities are introduced in the respective signal block which would be the case in a compressor). Here, according to an embodiment, the deflection in every frequency band is weighted with a psychoacoustic model 190, whereby the sound quality and loudness are to stay as high as possible. The psychoacoustic model 190 consists of a simple variation, e.g., of the A evaluation according to DIN EN 61672-1 2003-10, but can also represent a nonlinear implementation of the curves having the same loudness or a more complex model (e.g., masking in the time and frequency domain). All listings of psychoacoustic models stated herein are to be considered as exemplary and not limiting.

In that way, e.g., all L critical deflection values are processed until, e.g., an optimum reduction of the maximum overall deflection is obtained. If the overall deflection cannot be lowered below the limiting value $h_l X_{max}$ based on the critical deflection values, possibly, LMS optimization with the best attenuation factors up to then can be used as start values to find adequate attenuation factors.

If the attenuation factors for the current diaphragm deflection signal block $X_l$ are known, the same are regulated, e.g., via attack, hold and release functions (AHR) 153*b*, which can again be independent of one another within the individual frequency bands. Here, additionally, different AHR functions (e.g., a percussive AHR 153*b*, and a harmonic AHR 153*b*$_2$) can be applied to the percussive signal portion and the harmonic signal portion, which can improve the sound quality further (shorter time constants are, e.g., suitable for percussive signals, longer ones, e.g., for harmonic signals). For this, the signal $X_l$ should previously be divided into the respective portions by harmonic-percussive decomposition 151*b* and then be processed by the filterbank (frequency band decomposition 151). FIG. 6 represents this process schematically.

FIG. 6 shows an embodiment for different attack, hold and release functions 153*b*$_1$, 153*b*$_2$ for percussive and harmonic signal portions that can be a detail of the attack, hold and release functions 153*b* of FIG. 3. According to an embodiment, the attenuation factor determination 153 of FIG. 1 or FIG. 2 can have the same features and functionalities as the different attack, hold and release functions 153*b*$_1$, 153*b*$_2$.

The attenuation factors $g_0$ to $g_N$ can obtain and adapt both the percussive AHR 153*b*$_1$ as well as the harmonic AHR 153*b*$_2$ from the attenuation factor determination 153*a* (illustrated in FIG. 3).

According to an embodiment, the signal analysis 150 (headroom calculation 180*a*, 180*b*, search for critical deflection values 152) and/or the calculation of the attenuation factors 153, 153*a*, 153*b* can possibly take place in another way, wherein the final result can be very similar or identical.

According to an embodiment, the apparatus 100, the method 300 or the method 400 can be used in audio signal processing, the protection of loudspeakers, microspeakers in mobile devices (smartphones, tablets, notebooks, . . . ), large PA loudspeakers close to the mechanical performance limit and small transducers in Bluetooth loudspeakers.

According to an embodiment, the attack, hold and release functions (AHR) 153*b* can comprise both the percussive AHR 153*b*$_1$ as well as the harmonic AHR 153*b*$_2$, as well as a synthesis of a percussive 155*a* and a harmonic 155*b* modified diaphragm deflection signal of the current time block, but it is also possible that the attack, hold and release functions (AHR) 153*b* only comprise the percussive AHR 153*b*$_1$ and the harmonic AHR 153*b*$_2$ and the computing means 155 of FIG. 1, FIG. 2 or FIG. 3 comprises the synthesis of a percussive 155*a* and harmonic 155*b* modified diaphragm deflection signal of the current time block, as well as summing up 155 the percussive 155*a* and harmonic 155*b* modified diaphragm deflection signal of the current time block of FIG. 6. In other words, in 155*a* and 155*b*, the frequency bands can already be summed up separately for a percussive 155*a* and harmonic 155*b* diaphragm deflection signal portion. Summing up 155 in FIG. 6 then sums up the two diaphragm deflection signal portions.

Signal Synthesis

The percussive 155*a* and the harmonic 155*b* modified diaphragm deflection signal of the current time block is then, e.g., summed up 155, and from the limited deflection g, (e.g., the modified current diaphragm deflection signal), the voltage that has to be supplied to the loudspeaker 200 to cause the desired deflection is calculated, e.g., with the help of an inverse nonlinear deflection model 175. This inverse model can also be configured as simple filter, physical structural model or machine-learning model. All listings for inverse models stated herein are to be considered as exemplary and not as limiting. The summing up 155 as well as the percussive 155*a* and harmonic 155*b* modified diaphragm deflection signals of the current time block of FIG. 6 can comprise features and functionalities of the computing means 155 of FIG. 1, FIG. 2 and FIG. 3, and/or the computing means 155 of FIG. 1, FIG. 2 and FIG. 3 can comprise features and functionalities of the summing up 155 as well as the percussive 155*a* and harmonic 155*b* modified diaphragm deflection signal of the current time block of FIG. 6.

Effects and Advantages of the Technical Features of the Apparatus:

The signal analysis 150 can be configured to select attenuation coefficients, e.g., such that the deflection is optimally used without unnecessary headroom and attenuation coefficients are, e.g., not optimized with random start values. This is advantageous as the deflection can be maximized and the attenuation factors can be calculated faster than with a pure optimization.

The nonlinear look-ahead and look-back models can be configured to allow an exact prediction of the transducer behavior (e.g., the diaphragm deflection signal) with respective parameters. This is advantageous as the performance of the transducer (e.g., the loudspeaker 200) can be used better and no feedback path is needed.

The multiband approach (e.g., the frequency band decomposition 151) in combination with block-by-block constant attenuation factors can be configured to generate no new nonlinearities within the signal blocks (e.g., the diaphragm deflection signal blocks as, e.g., $X_i$, $X_{i+1}$). This is advantageous since, compared to a compressor approach, less sound artefacts can occur by nonlinearities.

The psychoacoustic model 190, e.g., an A evaluation, curves of the same loudness, masking in the time and frequency domain can be configured to select attenuation factors with regard to human hearing in an optimum manner. This is advantageous as sound quality and loudness can be maximized at the highest possible deflection.

Thus, the invention described herein can be advantageous as, according to an embodiment of the present invention, an output voltage can be calculated by an inverse nonlinear loudspeaker model (X→U), which can predict the diaphragm deflection signal more accurately than a model according to US20180014121A1. Additionally, for example, a psychoacoustic model is used for calculating attenuation factors (in the simplest configuration, e.g., the A evaluation) to increase the sound quality.

In A MODEL BASED EXCURSION PROTECTION ALGORITHM FOR LOUDSPEAKERS there is no multi-band approach but all frequencies are attenuated with a compressor, which again results in nonlinearities (THD, IMD) in the signal by the nonlinear characteristic curve of the compressor. According to an embodiment of the present invention, there is a multiband approach and a psychoacoustic model for calculating the attenuation factors (in the simplest configuration, e.g., the A evaluation), whereby mechanical protection, e.g., of a diaphragm of a loudspeaker can be increased and the sound quality can also be increased.

According to an embodiment of the present invention, nonlinear deflection models (forward and inverse) are used, however, in U.S. Pat. No. 8,855,322B2 the attenuation factors are applied, e.g., directly to the voltage signal; predicting the actual transducer behavior is thereby more accurate in the present invention than in U.S. Pat. No. 8,855,322B2. The optimization for calculating the subband attenuation factors uses, according to U.S. Pat. No. 8,855,322B2, an edge condition (namely multiplication of the amounts of band energy and transfer function by disregarding the phase position and possible cancellation), which has the effect that, according to the algorithm, the overall deflection frequently stays below the limiting value and the performance of the transducer is not completely used. According to an embodiment of the present invention, for example, the signal analysis has the effect that the phase position is considered and no unnecessary headroom remains.

According to an embodiment of the present invention, nonlinear models are used, or an accurate signal analysis is performed in the frequency bands, in contrary to U.S. Pat. No. 9,807,502BA.

Figure 7:
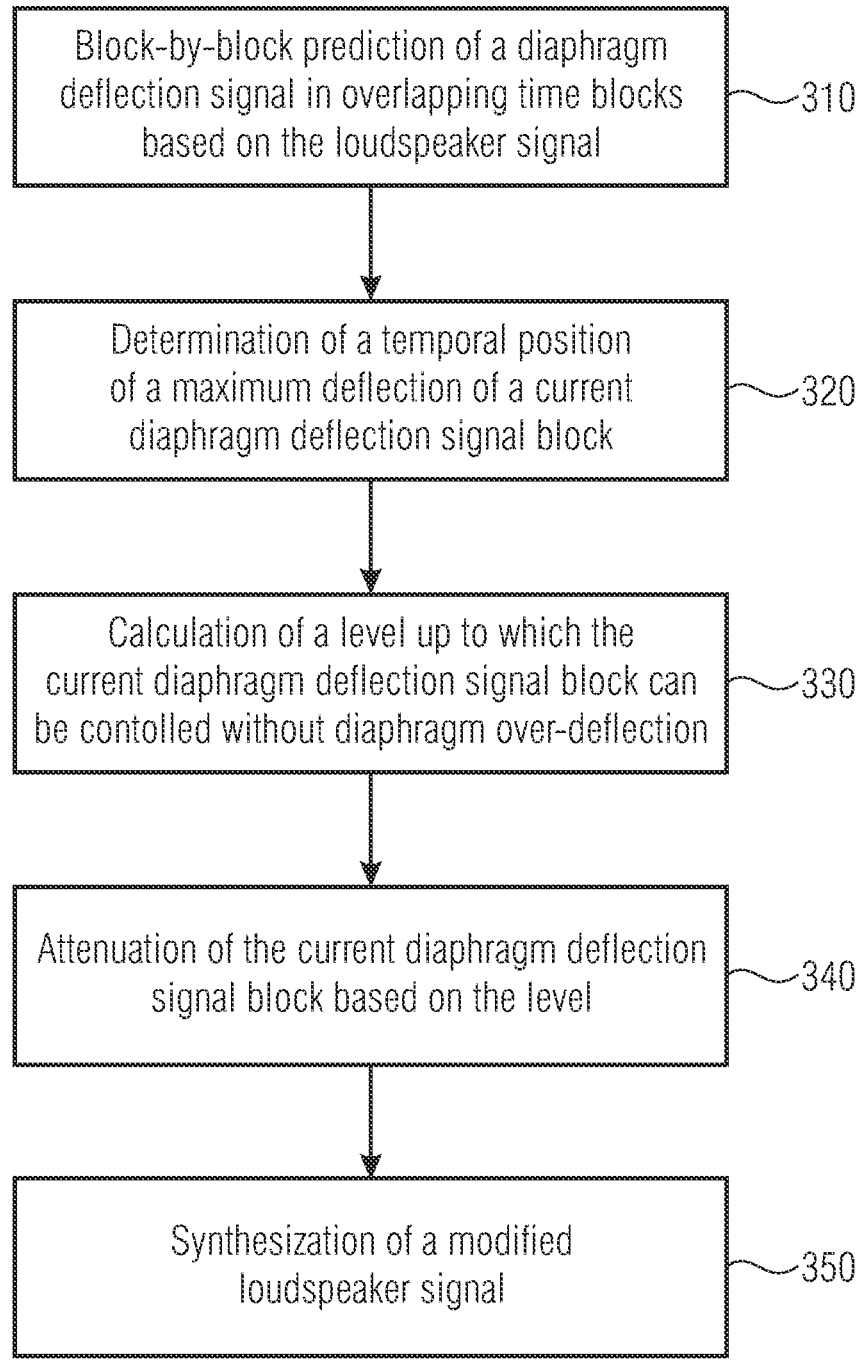
FIG. 7 is a block diagram of a method for modifying a loudspeaker signal for preventing diaphragm over-deflection according to an embodiment of the present invention.

FIG. 7 shows a block diagram of a method 300 for modifying a loudspeaker signal for preventing diaphragm over-deflection with block-by-block prediction 310 in overlapping time blocks based on the loudspeaker signal of a diaphragm deflection signal to obtain one diaphragm deflection signal block per time block. Further, the method 300 can comprise determination 320 of a temporal position of a maximum deflection of a current diaphragm deflection signal block of a current time block with an overlap area with a subsequent time block. Further, the method 300 can comprise calculation 330 of a level up to which the current diaphragm deflection signal block can be controlled without diaphragm over-deflection for the current time block, while considering a comparison of the current diaphragm deflection signal block with a subsequent diaphragm deflection signal block or an estimation of the subsequent diaphragm deflection signal block from the current diaphragm deflection signal block at the temporal position. Further, the method 300 can comprise an attenuation 340 of the current diaphragm deflection signal block based on the level to obtain a modified current diaphragm deflection signal block and synthesization 350 of a modified loudspeaker signal based on the modified current diaphragm deflection signal block.

Figure 8:
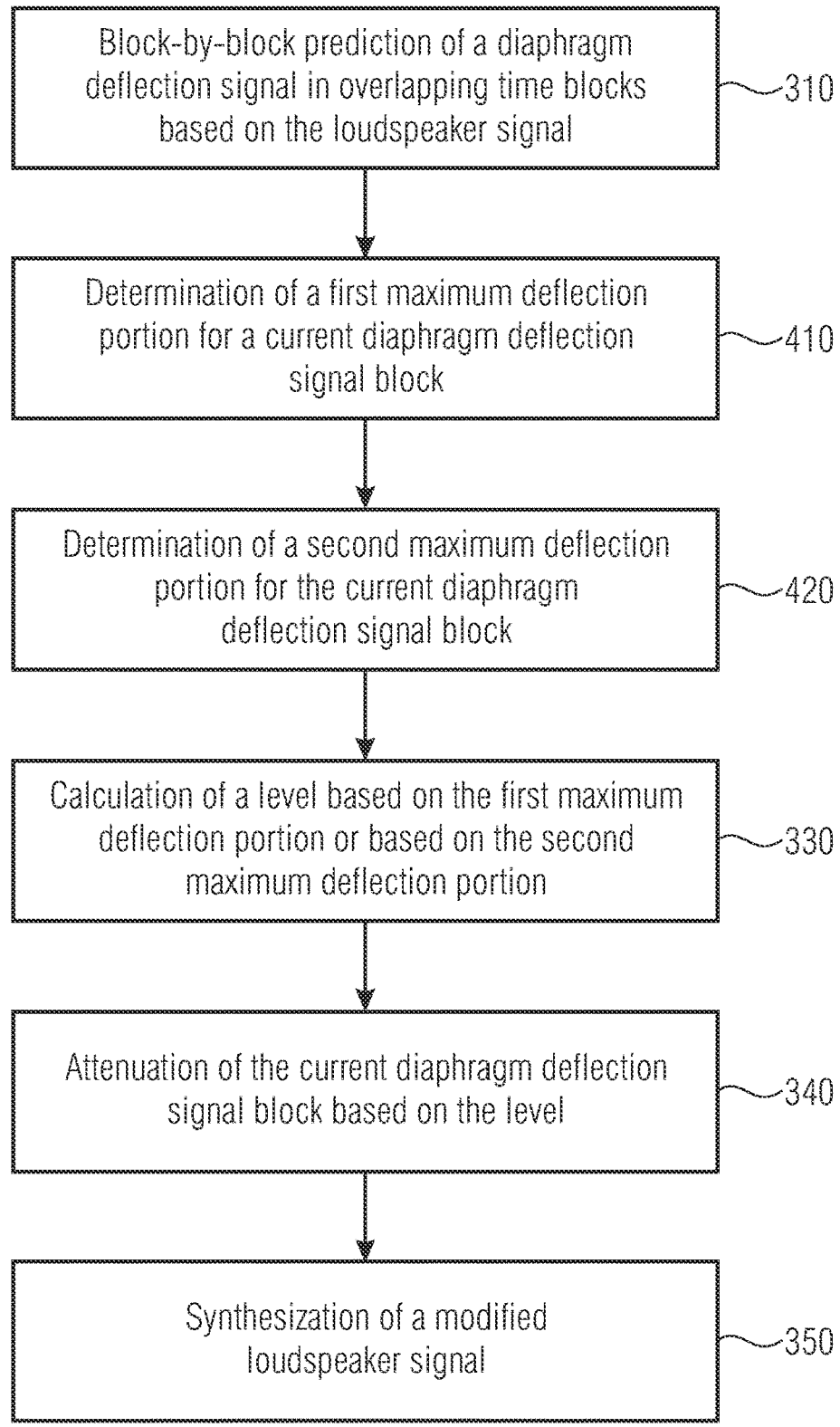
FIG. 8 is a block diagram of a method for modifying a loudspeaker signal for preventing diaphragm over-deflection with a determination of a first and a second maximum deflection portion according to an embodiment of the present invention.

FIG. 8 shows a block diagram of a method 400 for modifying a loudspeaker signal for preventing diaphragm over-deflection with block-by-block prediction 310 in overlapping time blocks based on the loudspeaker signal of a diaphragm deflection signal to obtain one diaphragm deflection signal block per time block. Further, the method 400 can comprise determination 410 of a first maximum deflection portion for a current diaphragm deflection signal block of a current time block in a first overlap area of the current time block with a preceding time block as well as in a residual area of the current diaphragm deflection signal block. Further, the method 400 can comprise determination 420 of a second maximum deflection portion for the current diaphragm deflection signal block of the current time block in a second overlap area of the current time block with a subsequent time block. Further, the method 400 can comprise calculation 330 of a level based on the first maximum deflection portion when the first maximum deflection portion is smaller than the second maximum deflection portion or calculation of the level based on the second maximum deflection portion when the second maximum deflection portion is smaller than the first maximum deflection portion. Further, the method 400 can comprise attenuation 340 of the current diaphragm deflection signal block based on the level to obtain a modified current diaphragm deflection signal block and synthesization 350 a modified loudspeaker signal based on a modified current diaphragm deflection signal block.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Apparatus for modifying a loudspeaker signal for preventing diaphragm over-deflection configured to
predict a diaphragm deflection signal, block-by-block, in overlapping time blocks based on the loudspeaker signal to acquire one diaphragm deflection signal block per time block;
determine a temporal position of a maximum deflection of a current diaphragm deflection signal block of a current time block within an overlap area with a subsequent time block;
calculate a level up to which the current diaphragm deflection signal block can be controlled without diaphragm over-deflection for the current time block, by considering a comparison of the current diaphragm deflection signal block with a subsequent diaphragm deflection signal block or an estimation of the subsequent diaphragm deflection signal block from the current diaphragm deflection signal block at the temporal position;
attenuate the current diaphragm deflection signal block based on the level to acquire a modified current diaphragm deflection signal block; and synthesize a modified loudspeaker signal based on the modified current diaphragm deflection signal block.

2. Apparatus according to claim 1, wherein, for calculating the level, the apparatus is configured to determine a quotient between the current diaphragm deflection signal block at the temporal position on the one hand and a sum of the subsequent diaphragm deflection signal block or the estimation of the subsequent diaphragm deflection signal block at the temporal position and the current diaphragm deflection signal block at the temporal position on the other hand.

3. Apparatus according to claim 1, wherein the apparatus is configured to scale the quotient with the safety factor.

4. Apparatus according to claim 1, wherein the apparatus is configured to decompose the current diaphragm deflection signal block into at least one frequency band signal time block.

5. Apparatus according to claim 4, wherein the apparatus is configured to determine, for each of the at least one frequency band signal time block, at least one further temporal position where a predetermined signal combination exceeds a maximum deflection limiting value in the first overlap area of the current time block with the preceding time block as well as in the residual current time block.

6. Apparatus according to claim 5, wherein the signal combination comprises:
an additive combination of the current diaphragm deflection signal block with a modified preceding diaphragm deflection signal block; and
an additive combination of the respective frequency band signal time block with the modified preceding diaphragm deflection signal block; and
an additive combination of an amount of the current diaphragm deflection signal block with an amount of the modified preceding diaphragm deflection signal block.

7. Apparatus according to claim 5, wherein the signal combination comprises at least one of the following additive combinations:
an additive combination of the current diaphragm deflection signal block with a modified preceding diaphragm deflection signal block; and
an additive combination of the respective frequency band signal time block with the modified preceding diaphragm deflection signal block; and
an additive combination of an amount of the current diaphragm deflection signal block with an amount of the modified preceding diaphragm deflection signal block.

8. Apparatus according to claim 5, wherein the apparatus is configured to determine an attenuation factor for each of the at least one frequency band signal time block based on the level and the further temporal position to attenuate the current diaphragm deflection signal block.

9. Apparatus according to claim 8, wherein the apparatus is configured to compare the attenuation factor per frequency band signal time block for the current time block with a version of the attenuation factor per frequency band signal time block for the preceding time block, reduced in attenuation strength by a predetermined fading-away function and to use a selected attenuation factor that is associated with a higher attenuation for the current time block of the same.

10. Apparatus according to claim 9, wherein the apparatus is configured to split the current diaphragm deflection signal block into a percussive signal portion and a harmonic signal portion and to determine the predetermined fading-away function in dependence on the percussive signal portion and/or the harmonic signal portion.

11. Apparatus according to claim 5, wherein the apparatus is configured to calculate, for each of the at least one further temporal position, a first maximum deflection portion for the current time block by considering the maximum deflection limiting value and the modified preceding diaphragm deflection signal block.

12. Apparatus according to claim 11, wherein the apparatus is configured to calculate the first maximum deflection portion from a quotient between a difference of the maximum deflection limiting value, wherein a sign of the maximum deflection limiting value depends on the current diaphragm deflection signal block at the further temporal position and the modified preceding diaphragm deflection signal block on the one hand and the maximum deflection limiting value on the other hand.

13. Apparatus according to claim 1, wherein the apparatus is configured to calculate a modified current loudspeaker signal block from the modified current diaphragm deflection signal block and to subject a first part of the modified current loudspeaker signal block to an overlap-add with a modified preceding loudspeaker signal block to synthesize a modified loudspeaker signal.

14. Apparatus according to claim 13, wherein the apparatus is configured to provide a current loudspeaker signal instead of the modified current loudspeaker signal block when a maximum deflection of the current diaphragm deflection signal block of the current time block does not exceed a maximum deflection limiting value.

15. Apparatus according to claim 1, wherein the apparatus is configured to attenuate the current diaphragm deflection signal block to calculate one or several attenuation factors based on the level and to compute the one or several attenuation factors with the current diaphragm deflection signal block.

16. Apparatus according to claim 15, wherein the apparatus is configured to compare the one or several attenuation factors for the current time block with a version of the one or several attenuation factors for the preceding time block, reduced in attenuation strength by a predetermined fading-away function and to use a selected attenuation factor that is associated with a higher attenuation for the current time block of the same.

17. Apparatus according to claim 16, wherein the apparatus is configured to split the current diaphragm deflection signal block into a percussive signal portion and a harmonic signal portion and to determine the predetermined fading-away function in dependence on the percussive signal portion and/or the harmonic signal portion.

18. Apparatus according to claim 17, wherein the predetermined fading-away function comprises shorter time constants for the percussive signal portion than for the harmonic signal portion.

19. Apparatus for modifying a loudspeaker signal for preventing diaphragm over-deflection configured to
predict a diaphragm deflection signal, block-by-block, in overlapping time blocks based on the loudspeaker signal to acquire one diaphragm deflection signal block per time block;
determine a first maximum deflection portion for a current diaphragm deflection signal block of a current time block in a first overlap area of the current time block with a preceding time block as well as in the residual area of the current diaphragm deflection signal block;
determine a second maximum deflection portion for the current diaphragm deflection signal block of the current time block in a second overlap area of the current time block with a subsequent time block;

calculate a level based on the first maximum deflection portion when the first maximum deflection portion is smaller than the second maximum deflection portion or calculate the level based on the second maximum deflection portion when the second maximum deflection portion is smaller than the first maximum deflection portion;

attenuate the current diaphragm deflection signal block based on the level to acquire a modified current diaphragm deflection signal block; and synthesize a modified loudspeaker signal based on the modified current diaphragm deflection signal block.

20. Apparatus according to claim 19, wherein the apparatus is configured to calculate the level based on the first maximum deflection portion by means of a product of a maximum deflection limiting value and the first maximum deflection portion or to calculate the level based on the second maximum deflection portion by means of a product of the maximum deflection limiting value and the second maximum deflection portion.

21. Apparatus according to claim 19, wherein the apparatus is configured to determine a temporal position of a maximum deflection of the current diaphragm deflection signal block of the current time block within the second overlap area with the subsequent time block; and determine, for the second maximum deflection portion, a quotient between the current diaphragm deflection signal block at the temporal position on the one hand and a sum of a subsequent diaphragm deflection signal block or an estimation of the subsequent diaphragm deflection signal block at the temporal position, based on the current diaphragm deflection signal block of the current time block, and the current diaphragm deflection signal block at the temporal position on the other hand.

22. Apparatus according to claim 21, wherein the apparatus is configured to scale the quotient with a safety factor.

23. Apparatus according to claim 19, wherein the apparatus is configured to estimate the second maximum deflection portion based on the current diaphragm deflection signal block.

24. Apparatus according to claim 19, wherein the apparatus is configured to estimate the second maximum deflection portion based on the current diaphragm deflection signal block by means of a neural network.

25. Method for modifying a loudspeaker signal for preventing diaphragm over-deflection, comprising:

block-by-block prediction of a diaphragm deflection signal in overlapping time blocks based on the loudspeaker signal to acquire one diaphragm deflection signal block per time block;

determination of a temporal position of a maximum deflection of a current diaphragm deflection signal block of a current time block within an overlap area with a subsequent time block;

calculation of a level up to which the current diaphragm deflection signal block can be controlled without diaphragm over-deflection for the current time block by considering a comparison of the current diaphragm deflection signal block with a subsequent diaphragm deflection signal block or an estimation of the subsequent diaphragm deflection signal block from the current diaphragm deflection signal block at the temporal position;

attenuation of the current diaphragm deflection signal block based on the level to acquire a modified current diaphragm deflection signal block; and synthesization of a modified loudspeaker signal based on the modified current diaphragm deflection signal block.

26. Method for modifying a loudspeaker signal for preventing diaphragm over-deflection, comprising:

block-by-block prediction of a diaphragm deflection signal in overlapping time blocks based on the loudspeaker signal to acquire one diaphragm deflection signal block per time block;

determination of a first maximum deflection portion for a current diaphragm deflection signal block of a current time block in a first overlap area of the current time block with a preceding time block as well as in the residual area of the current diaphragm deflection signal block;

determination of a second maximum deflection portion for the current diaphragm deflection signal block of the current time block in a second overlap area of the current time block with a subsequent time block;

calculation of a level based on the first maximum deflection portion when the first maximum deflection portion is smaller than the second maximum deflection portion or calculation of the level based on the second maximum deflection portion when the second maximum deflection portion is smaller than the first maximum deflection portion;

attenuation of the current diaphragm deflection signal block based on the level to acquire a modified current diaphragm deflection signal block; and synthesization of a modified loudspeaker signal based on the modified current diaphragm deflection signal block.

\* \* \* \* \*